US010460174B2

(12) United States Patent
She et al.

(10) Patent No.: US 10,460,174 B2
(45) Date of Patent: Oct. 29, 2019

(54) SYSTEM AND METHODS FOR ANALYSIS OF USER-ASSOCIATED IMAGES TO GENERATE NON-USER GENERATED LABELS AND UTILIZATION OF THE GENERATED LABELS

(71) Applicant: The Hong Kong University of Science and Technology, Hong Kong (CN)

(72) Inventors: James Pei Man She, Hong Kong (CN); Pak Ming Cheung, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 0 days.

(21) Appl. No.: 15/327,822

(22) PCT Filed: Jul. 22, 2015

(86) PCT No.: PCT/CN2015/084786
§ 371 (c)(1),
(2) Date: Jan. 20, 2017

(87) PCT Pub. No.: WO2016/011946
PCT Pub. Date: Jan. 28, 2016

(65) Prior Publication Data
US 2017/0206420 A1 Jul. 20, 2017

Related U.S. Application Data

(60) Provisional application No. 62/027,501, filed on Jul. 22, 2014.

(51) Int. Cl.
*G06K 9/18* (2006.01)
*G06K 9/00* (2006.01)
(Continued)

(52) U.S. Cl.
CPC ....... *G06K 9/00677* (2013.01); *G06K 9/6215* (2013.01); *G06K 9/6296* (2013.01); *G06Q 30/0201* (2013.01); *G06Q 50/01* (2013.01)

(58) Field of Classification Search
None
See application file for complete search history.

(56) References Cited

U.S. PATENT DOCUMENTS 9,792,289 B2 * 10/2017 Reininger ............. G06F 16/156
2007/0030364 A1    2/2007 Pere et al.
(Continued)

FOREIGN PATENT DOCUMENTS

CN       102207966 A    10/2011
WO    WO 2008/052226 A2   5/2008

OTHER PUBLICATIONS

Backstrom et al., "Supervised Random Walks: Predicting and Recommending Links in Social Networks," in Proceedings of the 4th ACM International Conference on Web Search and Data Mining, pp. 635-644 (2011).
(Continued)

*Primary Examiner* — Randolph I Chu
(74) *Attorney, Agent, or Firm* — Leydig, Voit & Mayer, Ltd.

(57) ABSTRACT

A system for annotating user images with non-user generated labels corresponding to a plurality of users and generating user profiles includes: one or more processor-readable media, configured to store processor-executable instructions for image analysis and user profile generation; and one or more processors, configured to, based on execution of, the stored processor-executable instructions: annotate user images with non-user-generated labels, wherein the non-user-generated labels correspond to visual features of the user images and generate user profiles based on non-user-
(Continued)

generated tags associated with images corresponding to each respective user.

26 Claims, 19 Drawing Sheets

(51) Int. Cl.
    G06Q 50/00    (2012.01)
    G06K 9/62    (2006.01)
    G06Q 30/02    (2012.01)

(56) References Cited

U.S. PATENT DOCUMENTS

| | | | | |
|---|---|---|---|---|
| 2010/0232656 | A1* | 9/2010 | Ryu | G06F 17/218 382/118 |
| 2011/0268331 | A1 | 11/2011 | Gerd et al. | |
| 2012/0294514 | A1* | 11/2012 | Saunders | G06K 9/00677 382/159 |
| 2014/0126826 | A1* | 5/2014 | Yabu | G06Q 30/06 382/190 |
| 2014/0285477 | A1* | 9/2014 | Cho | G09G 3/2003 345/207 |
| 2015/0089409 | A1* | 3/2015 | Asseily | G06Q 10/10 715/765 |
| 2015/0169645 | A1* | 6/2015 | Li | G06F 16/532 707/722 |
| 2017/0031934 | A1* | 2/2017 | Snoek | H04L 45/08 |

OTHER PUBLICATIONS

Blondel et al., "Fast unfolding of communities in large networks." *Journal of Statistical Mechanics: Theory and Experiment*, No. 10 (2008).
Chen et al., "Make New Friends, But Keep the Old: Recommending People on Social Networking Sites," in Proceedings of the SIGCHI Conference on Human Factors in Computing Systems, pp. 201-210 (2009).
Cheung et al., "Bag-of-Features Tagging Approach for a Better Recommendation with Social Big Data." in Proceedings of the 5th International Conference on Advances in Information Mining and Management. (2014).
Chow et al., "Social network, social trust and shared goals in organizational knowledge sharing." Information & Management 45.7: pp. 458-465 (2008).
Clauset et al., "Finding community structure in very large networks," *Physical Review E*, vol. 70, pp. 066111 (2004).
Gilbert et al., "Predicting tie strength with social media," in Proceedings of the SIGCHI Conference on Human Factors in Computing Systems, pp. 211-220 (2009).
Girvan et al., "Community structure in social and biological networks." in Proceedings of the National Academy of Sciences, vol. 99, No. 12, pp. 7821-7826 (2002).
Golder et al., "Structural predictors of tie formation in twitter: Transitivity and mutuality," in Social Computing (SocialCom), 2010 IEEE Second International Conference on, pp. 88-95 (2010).
Guy et al., "Personalized recommendation of social software items based on social relations," in Proceedings of the 3rd ACM Conference on Recommender Systems, pp. 53-60 (2009).
Guy et al., "Social media recommendation based on people and tags," in Proceedings of the 33rd International ACM SIGIR Conference on Research and Development in Information Retrieval, pp. 194-201 (2010).
Hammond et al., "Social bookmarking tools (I) a general review," *D-Lib Magazine*, vol. 2 (2005).
Hastie et al., "The Elements of Statistical Learning," in Springer Series in Statistics, (2001).
Hsu et al., "Collaborative and structural recommendation of friends using weblog-based social network analysis." in AAAI Spring Symposium: Computational Approaches to Analyzing Weblogs, pp. 55-60 (2006).

Jaho et al., "Iscode: A framework for interest similarity-based community detection in social networks," in Proceedings of IEEE Conference on Computer Communications Workshops, pp. 912-917 (2011).
Jin et al., "Structure of growing social networks." *Physical review E* 64.4 (2001).
Kadir et al., "Saliency, scale and image description," *International Journal of Computer Vision*, vol. 45, pp. 83-105 (2001).
Kahanda et al., "Using transactional information to predict link strength in online social networks." in Proceedings of the 3rd International AAAI Conference on Weblogs and Social Media, pp. 74-81 (2009).
Kennedy et al., "How flickr helps us make sense of the world: Context and content in community-contributed media collections," in Proceedings of the 15th International Conference on Multimedia, pp. 631-640 (2007).
Kernighan et al., "An efficient heuristic procedure for partitioning graphs," *Bell System Technical Journal*, vol. 49, pp. 291-307 (1970).
Kim et al., "Associative face co-occurrence networks for recommending friends in social networks," in Proceedings of 2nd ACM SIGMM Workshop on Social Media, pp. 27-32 (2010).
Krackhardt et al., "Whether close or far: Social distance effects on perceived balance in friendship networks." *Journal of Personality and Social Psychology*, vol. 76, pp. 770 (1999).
Leroy et al., "Cold start link prediction," in Proceedings of the 16th ACM SIGKDD International Conference on Knowledge Discovery and Data Mining, pp. 393-402 (2010).
Leskovec et al., "Predicting positive and negative links in online social networks," in Proceedings of the 19th International Conference on World Wide Web, pp. 641-650 (2010).
Li et al., "Tag-based social interest discovery," in Proceedings of the 17th International Conference on World Wide Web, pp. 675-684 (2008).
Lowe et al., "Distinctive image features from scale-invariant keypoints," *International Journal of Computer Vision*, vol. 60, pp. 91-110 (2004).
Lü et al., "Link prediction in complex networks: A survey," *Physica A: Statistical Mechanics and its Applications*, vol. 390, pp. 1150-1170 (2011).
Mislove et al., "Measurement and analysis of online social networks," in Proceedings of the 7th ACM SIGCOMM Conference on Internet Measurement, pp. 29-42 (2007).
Moxley et al., "Not all tags are created equal: Learning flickr tag semantics for global annotation," in Proceedings of IEEE International Conference on Multimedia & Expo, pp. 1452-1455 (2009).
Newman, "Fast algorithm for detecting community structure in networks," *Physical Review E*, vol. 69, pp. 066133 (2004).
Ottoni et al.,, "Ladies First: Analyzing gender roles and behaviors in pinterest." in Proceedings of the 7th International AAAI Conference on Weblogs and Social Media, (2013).
Parimi et al., "Predicting friendship links in social networks using a topic modeling approach," *Advances in Knowledge Discovery and Data Mining*, Springer, pp. 75-86 (2011).
Pothen, "Graph partitioning algorithms with applications to scientific computing," in Parallel Numerical Algorithms, Springer, pp. 323-368 (1997).
Qi et al., "Community detection with edge content in social media networks," in Proceedings of IEEE 28th International Conference on Data Engineering, pp. 534-545 (2012).
Rae et al., "Improving tag recommendation using social networks," In Proceedings of the International Conference on Adaptivity, Personalization and Fusion of Heterogeneous Information, pp. 92-99 (2010).
Sang et al., "User-aware image tag refinement via ternary semantic analysis," IEEE Transactions on Multimedia, vol. 14, No. 3, pp. 883-895 (2012).
Shepitsen et al., "Personalized recommendation in social tagging systems using hierarchical clustering," in Proceedings of the 2008 ACM Conference on Recommender Systems, pp. 259-266 (2008).
Sigurbjörnsson et al., "Flickr tag recommendation based on collective knowledge," in Proceedings of the 17th International Conference on World Wide Web, pp. 327-336 (2008).

(56) References Cited

OTHER PUBLICATIONS

Tang et al., "Integrating social media data for community detection," in Modeling and Mining Ubiquitous Social Media Anonymous Springer, pp. 1-20 (2012).

Traud et al., "Community structure in online collegiate social networks" (2008).

Wang et al., "Joint Social and Content Recommendation for User-Generated Videos in Online Social Network," IEEE Transactions on Multimedia, vol. 15, No. 3, pp. 698-709 (2013).

Weng et al., "Virality prediction and community structure in social networks," Scientific Reports, vol. 3, (2013).

Xie, "Potential friend recommendation in online social network," in IEEE International Conference on Cyber, Physical and Social Computing (CPSCom), pp. 831-835 (2010).

Yang et al., "Like like alike: Joint friendship and interest propagation in social networks," in Proceedings of the 20th International Conference on World Wide Web, pp. 537-546 (2011).

X. Zhang et al., "Tagging image by merging multiple features in a integrated manner," *Journal of Intelligent Information Systems*, vol. 39, pp. 87-107 (2012).

Zhang et al., "Social image tagging using graph-based reinforcement on multi-type interrelated objects," in Signal Process, vol. 93, No. 8, pp. 2178-2189 (2013).

Zhao et al., "Temporal and information flow based event detection from social text streams," in Proceedings of the 21st AAAI Conference on Artificial Intelligence, pp. 1501-1506 (2007).

Zheng et al., "Recommending friends and locations based on individual location history," ACM Transactions on the Web (TWEB), vol. 5, pp. 5 (2011).

Zhou et al., "UserRec: A user recommendation framework in social tagging systems." in Proceedings of the 24th AAAI Conference on Artificial Intelligence, (2010).

State Intellectual Property Office of the P.R. China, International Search Report in International Application No. PCT/CN2015/084786 (dated Sep. 25, 2015).

\* cited by examiner

200 a feature (128 dimensions)

| | 0.2182 | 0.0324 | 0.0253 | 0.0197 | 0.1242 | 0.0782 | 0.0085 | 0.0410 | 0.2182 | 0.0249 | 3.8874e-04 |
|---|---|---|---|---|---|---|---|---|---|---|---| an image by a feature (128 dimensions)

| | 0.2182 | 0.0324 | 0.0253 | 0.0197 | 0.1242 | 0.0782 | 0.0085 | 0.0410 | 0.2182 | 0.0249 | 3.8874e-04 |
|---|---|---|---|---|---|---|---|---|---|---|---|
| 0.0049 | 0.0062 | 0.0373 | 0.0163 | 0.0025 | 3.8157e-04 | 5.7133e-04 | 0.0030 | 0.0068 | 0.0708 | 0.2277 |
| 0.0294 | 0.1336 | 0.0774 | 0.0119 | 0.0064 | 0.0059 | 0.0025 | 0.0024 | 0.2177 | 0.0952 | 0.0725 |
| 0.0505 | 0.0148 | 0.0090 | 0.0344 | 0.0816 | 0.0678 | 0.2677 | 0.0578 | 0.0091 | 0.0097 | 0.0114 |
| 0.0147 | 0.0418 | 0.2076 | 0.0581 | 0.0290 | 0.0210 | 0.0180 | 0.0624 | 0.0145 | 0.0356 | 0.0979 |
| 0.0027 | 0.0122 | 0.0197 | 0.0087 | 0.0066 | 0.0361 | 0.1448 | 0.0239 | 0.1019 | 0.0792 | 0.0639 |
| 0.2399 | 0.0148 | 7.7597e-04 | 0.0021 | 0.0166 | 0.0038 | 5.5839e-04 | 0.0336 | 0.2172 | 0.0070 | 3.7400e-04 |
| 0.2213 | 0.0234 | 0.0226 | 0.0194 | 0.1202 | 0.0782 | 0.0064 | 0.0777 | 0.2393 | 0.0335 | 0.0030 |
| 0.0346 | 0.0027 | 0.0092 | 0.0044 | 0.0145 | 0.0331 | 0.1609 | 0.0857 | 0.0172 | 0.0252 | 0.2426 |
| 0.0017 | 0.0064 | 0.0215 | 0.0048 | 0.0149 | 0.0570 | 0.0709 | 0.0277 | 0.0319 | 0.0659 | 0.2427 |
| 0.0979 | 0.0346 | 1.7065e-05 | 0.0064 | 0.2002 | 0.0783 | 0.1095 | 0.0612 | 0.1075 | 0.0328 | 3.0514e-04 |
| 0.0088 | 0.0270 | 0.0948 | 0.0264 | 0.0017 | 0.0027 | 0.0149 | 0.0069 | 0.1409 | 0.0564 | 0.1115 |
| 0.1900 | 0.0324 | 0.0457 | 0.0565 | 0.1495 | 0.0786 | 0.0341 | 0.1106 | 0.2196 | 0.0484 | 0.0194 |

Fig. 12

| 0.0233 | 0.0266 | 0.0233 | 0.1647 | 0.0141 | 0.0455 | 0.0452 | 0.0262 | 0.0489 | 0.0493 | 0.0190 |
|---|---|---|---|---|---|---|---|---|---|---|

SYSTEM AND METHODS FOR ANALYSIS OF USER-ASSOCIATED IMAGES TO GENERATE NON-USER GENERATED LABELS AND UTILIZATION OF THE GENERATED LABELS

CROSS-REFERENCE TO RELATED APPLICATIONS

This application is a U.S. National Phase application under 35 U.S.C. § 371 of International Patent Application No. PCT/CN2015/084786, filed Jul. 22, 2015, which is a PCT application claiming the benefit of U.S. Provisional Patent Application No. 62/027,501, filed Jul. 22, 2014, both of which are incorporated by reference in their entireties.

BACKGROUND

Many social media applications, such as recommendation, virality prediction and marketing, make use of social graphs which indicate connections between users. However, these social graphs may not be explicitly specified or may be kept privately.

Meanwhile, advanced mobile devices, such as smartphones and wearable devices, are becoming an increasingly integrated part of people's lives, and a massive amount of user images are being shared everyday. These user-shared images are often publicly or easily accessible by others, for example, through the Internet.

SUMMARY

In an exemplary embodiment, the invention provides a system for analyzing user images corresponding to a plurality of users and generating distributions that reflects user characteristics or connections, and be considered as profile. The system includes: one or more processor-readable media, configured to store processor-executable instructions for image analysis and user profile generation; and one or more processors, configured to, based on execution of the stored processor-executable instructions: annotate user images with non-user-generated labels, wherein the non-user-generated labels correspond to visual features of the user images; and generate distribution based on non-user-generated tags associated with images corresponding to each respective user that can reflect the characteristics of a user.

BRIEF DESCRIPTION OF THE SEVERAL VIEWS OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 12 is a screenshot depicting an example of a feature in SIFT.

FIG. 13 is a screenshot depicting an example of a visual word.

FIG. 14 is a screenshot depicting an example of multiple visual words.

DETAILED DESCRIPTION

Figure 1:
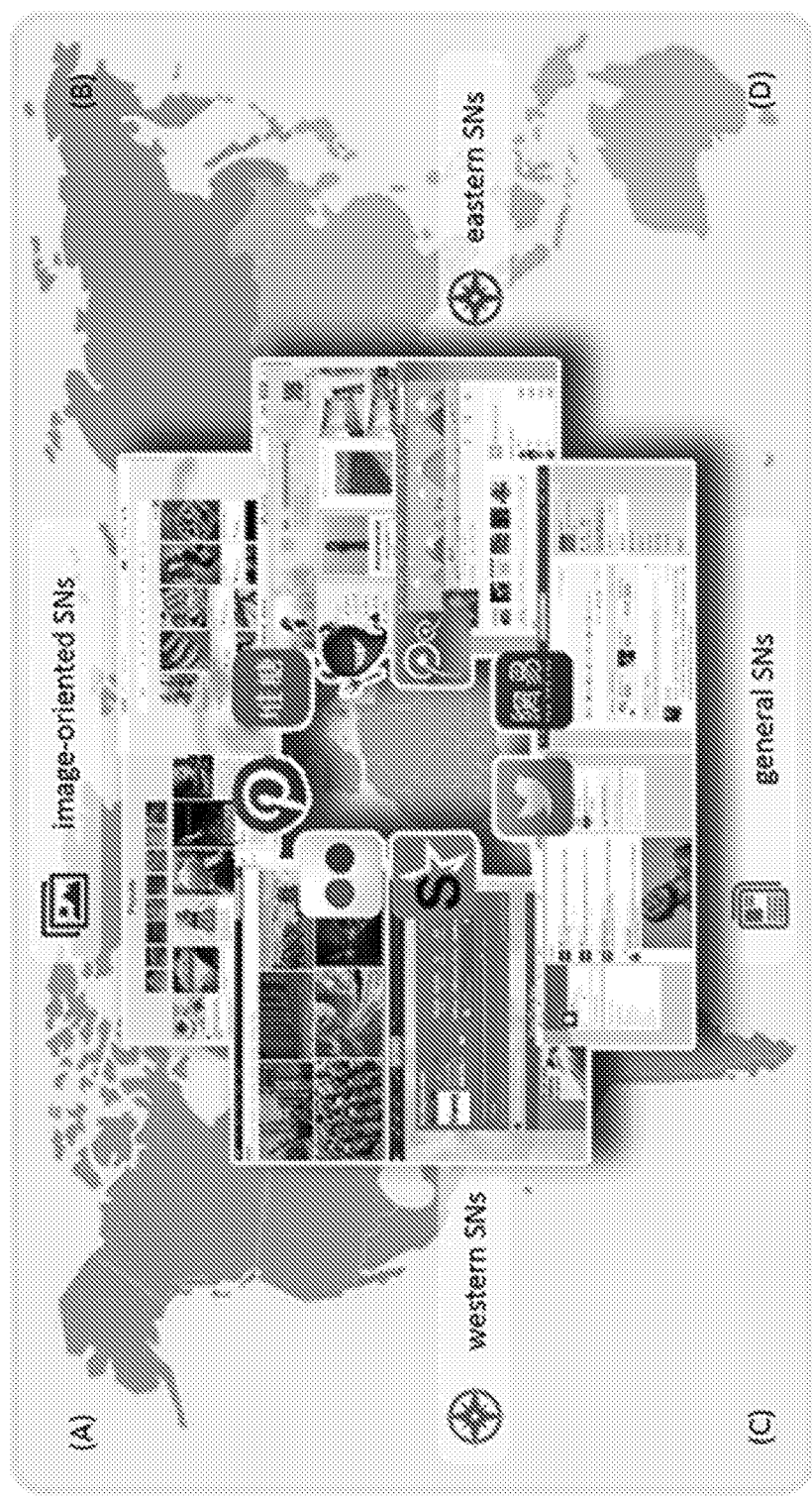
FIG. 1 illustrates exemplary social networks from which images shared by a user may be obtained.

Exemplary embodiments of the image analysis system discussed herein provide for analysis of the massive amount of user-shared images to produce machine-generated (or "non-user-generated") tags that correspond to groups of image features. These machine-generated tags can be used, for example, to discover user connections for personalized information/services for users.

User connection and community discoveries are two important functions in online social networks and services. User connections can be in many forms, such as users with similar interests, and users from the same physical location. On social media, user connections can be the following/follower-relationship, as in Twitter™, and friendship, as in Facebook™, and hence social graphs (SGs) can be formed by those following/follower-relationships and friendships. By the nature of a connection, two users who have a connection between them, are more likely to interact with each other, share similar content and have more mutual friends.

Information regarding those user connections and the community formed by those connections in social media is valuable. Companies such as Twitter™ and Pinterest™, have comprehensive data about user connections to improve the relevance of the information they offer to users through discovering user connections and communities. However, accessing the SGs, originally provided by users, in many social networks today, may be difficult or impracticable, e.g., due to the data being maintained in a state of limited accessibility. For example, popular mobile social networking applications, such as WhatsApp™ (owned by Facebook™ from the US) and WeChat™ (owned by Tencent™ from China), keep the information exclusive to their related services or technologies only. Additionally, some users may hide their connection information from the public in some social network platforms due to their privacy concerns.

With such limited access to SGs, effective discoveries of user connections and communities for novel applications may be difficult or almost impossible for researchers, merchants, third-party service providers and individuals.

However, billions of user shared images are seamlessly generated by individuals everyday in many social networks, and this particular form of user generated content is very widely accessible by others due to its intrinsic nature for online social sharing. Exemplary embodiments of the image analysis and non-user generated label systems and methods described herein utilize this massive source of shared image data to discover user connections and communities, allowing these user shared images to be a more accessible and effective alternative to the traditional approach of relying on SGs or user-generated tags (or "user annotated" tags).

Certain exemplary embodiments of the present invention provide systems and methods based on an analytic framework that uses "machine-generated" or "non-user-generated" tags (which may or may not include data in a form that would be intelligible to a human) that are based on user shared images to facilitate connection discovery by providing an enhanced quality of image annotation using any computer vision, image/signal processing techniques. Users are represented by the distribution calculation from the non-user-generated tags, such as counting occurrences of unique non-user-generated tags, and connections between users can be discovered from these occurrences (e.g., based on the similarities of the tags corresponding to a first user with the tags corresponding to a second user). These connections are thus discoverable even without access to social graphs, and are useful for a variety of applications, for example, including information or service recommendations in any social network with image sharing. The non-user-generated tags can be generated from any computer vision, image/signal processing techniques that can produce the labels based on the visual feature of an image.

FIG. 1 depicts eight exemplary social networks of users. These exemplary social networks are exemplary sources of image data that may be analyzed using embodiments of the image analysis and tag generation systems and methods described herein. Users in a general social network (e.g., Twitter™) can flexibly generate and share content with others in one or any combination of the multimedia formats (e.g., texts, images, videos or any emerging format, such as locations). However, in an image-oriented social network (e.g., Pinterest™), images are the only or primary format of the content to be generated by a user and shared with others. The social networks can also be classified as western and eastern social networks by their originating locations, either from the West or from the East with different user bases, and different user cultures. Flickr™ and Pinterest™ are image-oriented social networks from the West, as depicted in section (A) of FIG. 1. Duitang™ and Digu™ are similar to Pinterest™ and Flickr™, but originated from the East, as depicted in section (B) of FIG. 1. The other four depicted social networks are general social networks which are not necessarily image-based. Twitter™ and Skyrock™, which originated from the West, are depicted in section (C) of FIG. 1, while Tencent™ Weibo and 163™ Weibo, which originated from the East, are depicted in section (D) of FIG. 1.

Through analysis of exemplary images available on these exemplary networks, exemplary embodiments of the invention demonstrated that users who form a following/followee relationship, as well as users from the same community, share visually similar images, and, when those images are analyzed, have analysis results indicating higher image similarities. Exemplary embodiments of the inventive image analysis systems and methods discussed herein are thus able to utilize user shared images (which are relatively more accessible and/or reliable than SGs and user-generated tags) for a variety of applications, including for example, discovery of user connections and communities on each social network.

A few principles demonstrated by exemplary embodiments of the invention are as follows:

1) connected users and users from the same community tend to share images with higher similarities regardless of the origin and content sharing mechanisms of a social network;

2) users with a higher similarity of shared images implies a higher probability that they are connected on social media, which allows analysis of user shared images by exemplary embodiments of the invention to discover user connections from the shared images (as will be discussed further below, through testing, an exemplary implementation of the invention was demonstrated to be 60% better than the common approach of relying on user-generated tags, which is conventionally used in many social networks today);

3) two users are likely to be from the same community on social media if their shared images have higher similarities, which allows analysis of user shared images by exemplary embodiments of the invention to discover user communities by shared images (as will be discussed further below, through testing, an exemplary implementation of the invention was demonstrated to achieve comparable performance to conventional methods where access to SGs is already available).

In one of the tests performed to demonstrate the effectiveness of the exemplary embodiments of the invention, an image analysis system according to an exemplary embodiment was configured and tested as a user connection recommendation system on each of the social networks from FIG. 1 using a dataset having over 2 million user shared images. Among different types of user connections on social media, 20 million following/followee-relationships, the most fundamental and accessible types of user connections, were collected for this test, as shown in Table 1 below.

TABLE 1

The datasets from 8 real-world social networks measurement

| origins | social network | user shared images | total connections | existing connections | network density | users | *sharing mechanism |
|---|---|---|---|---|---|---|---|
| US | Flickr ™ | 201,006 | 92,056 | 1418 | 0.48% | 562 | image-oriented |
| US | Pinterest ™ | 324,369 | 483,798 | 1212 | 0.35% | 600 | image-oriented |
| US | Twitter ™ | 150,696 | 14,487,045 | 1364 | 0.65% | 462 | general |
| France | Skyrock ™ | 176,547 | 2,439,058 | 7348 | 1.41% | 722 | general |
| China | Duitang ™ | 396,534 | 30,107 | 1034 | 0.28% | 634 | image-oriented |
| China | Digu ™ | 148,337 | 43,141 | 798 | 0.49% | 404 | image-oriented |
| China | 163 ™ weibo | 187,491 | 850,487 | 1732 | 0.71% | 493 | general |
| China | Tencent ™ Weibo | 490,624 | 1,091,492 | 2176 | 0.86% | 503 | general |
| | Total | 2,075,604 | 19,517,184 | | | | |

*By considering the generic properties of the eight social networks in this research, a social network with image sharing mechanism can be either categorized as a general social network, or an image-oriented social network.
Note:
User of a social network with general sharing mechanism can share images, videos, texts and etc., whereas image-oriented social networks are mainly with images.

In an exemplary embodiment, an image analysis system uses Bag-of-Feature Tagging (BoFT) techniques to generate non-user-generated tags. It was demonstrated through testing that users which share images with high similarity with respect to the non-user-generated BoFT tags are likely to be connected, and based thereon, the image analysis system is able to discover user connections and communities through the widely accessible user shared images even without the exclusive access to the SGs. Further, the image analysis processes utilized by the image analysis system achieve better results than conventional methods relying upon user-annotated tags (i.e., tags that are manually associated with an image by a user, such as hashtagged text accompanying an image posted to a social network). Additionally, in an exemplary embodiment, the image analysis system is further able to identify user gender based on image analysis performed on images shared by respective users.

Although identifying user connections and community discovery, as well as providing recommendations for user connections and services/products, are a few exemplary applications of the analytic framework discussed herein, it will be appreciated that embodiments of the invention are not limited to such connection and community discovery-related applications. For example, other applications, including but not limited to gender identification and categorization of user characteristics, can also be implemented with the disclosed framework for image analysis and tag generation.

Image Annotation Using Non-User Generated Labels

Figure 2:
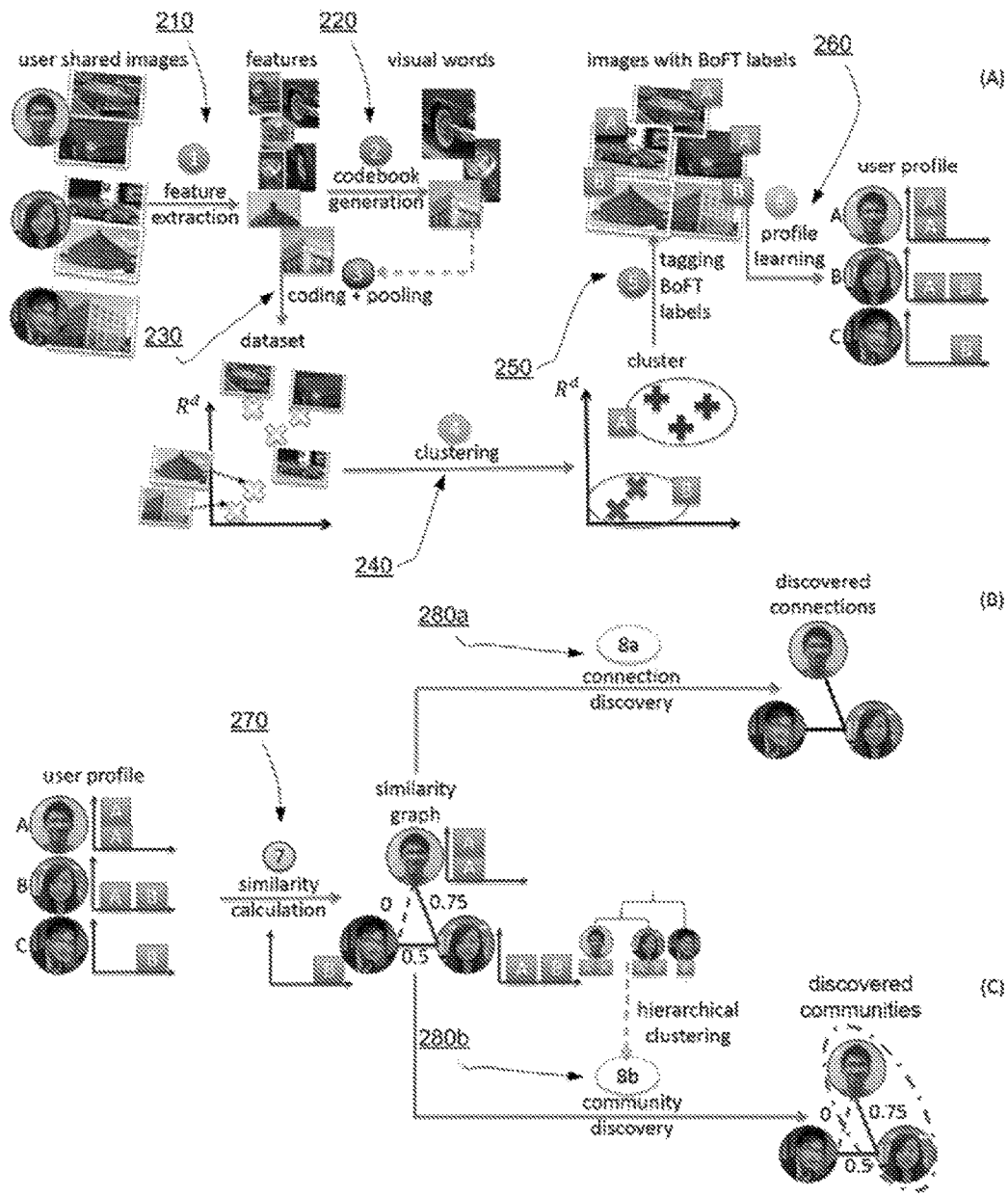
FIGS. 2(A)-(C) depict flowcharts illustrating a system and method for analyzing user image data and applications thereof.

In an exemplary embodiment, user shared images are analyzed using BoFT techniques, and each image is tagged with a non-user generated label, BoFT label (or "BoFT tag"). BoF is a computer vision approach for analyzing images. FIGS. 2(A)-(C) illustrate an exemplary system and method for image analysis, BoFT, and profile generation, as well as connection discovery and community discovery applications based thereon. FIG. 2(A) shows the BoFT analysis of user images. FIG. 2(B) is shows user connection discovery based on the BoFT tag-based profiles. FIG. 2(C) shows user community discovery based on the BoFT tag-based profiles.

It will be appreciated that generating non-user-generated tags (or "labels") is not limited to BoFT techniques. Other image processing/computer vision techniques that can generate labels, such as using Gradient Location and Orientation Histogram, or using other supervised object recognition techniques, such as GIST.

According to an exemplary embodiment, the image analysis system 200 includes a feature extractor 210, a codebook generator 220, a feature pooler 230, a clusterer 240, a tagger 250, and a profiler 260. It will be appreciated that these parts of the system may be implemented in hardware, firmware, and/or software. For example, in one exemplary implementation, the feature extractor 210, codebook generator 220, feature pooler 230, clusterer 240, tagger 250, and profiler 260 are software modules in the form of processor-executable instructions stored on a processor-readable medium, and functions performed by each of these modules are carried out by a processor of a computing device, for example, a computer server. In other exemplary embodiments, the feature extractor 210, codebook generator 220, feature pooler 230, clusterer 240, tagger 250, and profiler 260 may each be separate computing devices having a processor with volatile and/or non-volatile memory storage. In still other exemplary embodiments, different components may be combined within certain devices and distributed among multiple devices—for example, certain functionality may be implemented on mobile devices on the user side, in order to offload processing to the mobile devices to distribute the computing requirement, while other functionality is implemented on a network-side computing device such as a server. The number of features in codebook generation and the number of labels in clustering are subject to the choices of a computer vision or image/signal processing technique to analyze an image.

In step 1, the feature extractor 210 extracts the local features of the images of the users. These unique features can be detected by feature detection, such as the Harris Affine detector, Maximally Stable Extremal Regions detector, and Kadir-Brady saliency detector. The extracted features of the same object are relatively consistent across images taken under different viewing angles and lighting conditions. They are represented in a way that is independent of the size and orientation, such as scale-invariant feature transform (SIFT), or GIST.

In step 2, the codebook generator 220 generates and obtains "visual words" that can represent the features obtained by the feature extractor 210. This step starts with clustering extracted visual features into groups by clustering techniques such as k-mean clustering based on their visual similarity, and the mean vectors of each group are defined as a visual word. In an alternative exemplary embodiment, a model such as a Gaussian model may be used to represent a visual word. Other techniques that may be used include, for example, the Canopy clustering algorithm and Linde-Buzo-Gray algorithm. Thus, the visual word may be represented by combining corresponding features of the images using various exemplary techniques (such as the described mean vector, Gaussian model, Canopy clustering algorithm, and the Linde-Buzo-Gray techniques).

In step 3, the feature pooler 230 encodes the images containing the detected features with the corresponding visual words. Feature coding represents each of the visual features based on the closest visual word. The images are represented by a feature vector in the feature pooling. For example, one technique that may be used is counting the number of occurrences of each unique visual word on an image as the feature vector of the image for comparing the similarity of images.

In step 4, the clusterer 240 uses the feature vector obtained for each image to group images that are visually similar. Images with the same or similar objects have similar visual features, and thus these images have similar feature vectors. Accordingly, each cluster obtained by clustering feature vectors contains images corresponding to similar objects.

In step 5, after obtaining the clusters, the images in each respective cluster are tagged by the tagger 250 with respective tags (or "labels"). Images associated with the same tag indicate that those images are visually similar. These tags are non-user-generated tags, meaning that the user shared images were analyzed and tagged without any manual inputs and processes. In other exemplary embodiments, the clusters or groups of images may be pre-defined with one or more non-user-generated tags or labels, and the tagger 250 determines or identifies the non-user-generated tags or labels corresponding to the images in each group.

In step 6, the profiler 260 profiles the users based on the images uploaded by each of the users with a distribution generated from non-user generated labels. A user profile corresponds to non-user-generated tags associated with images shared by the users. In the example depicted in FIG. 2, the image analysis system uses the set of BoFT labels corresponding to a user's shared images as the profile for the user, and the profile includes the number of occurrences of each BoFT label in the profile. Because the images shared by the user reflect the user's interests, the user profile can be used for applications such as connection discovery and community discovery. Users with similar interests (e.g., sports clubs, favorite car, etc.) share images of similar objects.

In an embodiment, the image analysis system may incorporate new images into the data set when new images are uploaded to a social network (data source) and/or add new users to the dataset when new users join the social networks, and the image analysis, tagging, and profile generation processes may be repeated or supplemented. Alternatively, the image could be uploaded by users to an application that applies this invention.

The BoFT labels automatically generated and associated to the user images represent users' characteristic, such as user gender and follower/followee relationships. As such, the BoFT labels also contain user social network information, existing or potential, discovered or undiscovered.

As the non-user generated labels are generated automatically for all features in each image, this information may be archived for future use, such as for discovering relationships with new users. As the non-user generated labels represent image features and are not limited to human textual labels or human vocabularies, there is no need to manually introduce new labels with new terminologies for old user images. Features can be compared for similarities as needed on the fly.

Furthermore, the non-user generated labels are independent of specific social media network platforms, and thus can be easily adapted for use in any social media network platform to build user connections and/or communities (or even simple user categorizations).

BoFT-Based User Connections and Community Discovery

According to embodiments of the present invention, BoF is using as an example to produce non-user generated labels, and the BoFT similarity among users may be found through their shared images. A degree of BoFT similarity may be determined based on user profiles. Further, user connections and the user communities may be discovered based on the determined amounts of BoFT similarity.

In an exemplary embodiment, the image analysis system 200 further includes a distribution generated from non-user generated labels, a similarity comparator 270, a connection discoverer 280a, and/or a community discoverer 280b.

In step 7, after the user profiles are obtained, the profile comparator 270 compares user profiles to calculate a degree of similarity between users. When the user profile that reflects the interests of each user is established, user connections and the user communities may be discovered based on the BoFT similarity of pairs of users. Those who share similar images will result in a higher BoFT similarity. In an exemplary embodiment, a pairwise similarity comparison among user profiles is used based on the distribution of non-user generated labels, and the similarity is calculated using the following formula:

$$S_{i,j} = S(L_i, L_j) = \frac{L_i \cdot L_j}{\|L_i\| \cdot \|L_j\|} \tag{1}$$

where $L_i$ and $L_j$ are the sets of BoFT labels of their shared image in the profiles of users A and B, respectively. (Note: this equation was used for calculating the results depicted in FIGS. 5(A), 5(B), 6, 7(A), 7(B), 10(A) and 10(B) with respect to the sample user dataset used in the corresponding tests.) Alternatively, the similarity calculation can be based on any similarity calculations, such as Jaccord similarity that can tell the similarity of two users based on the distribution, or correlation value through any mathematical functions that a higher value implies more similar.

In step 8a, after the user profiles are obtained, the connection discoverer 280a makes user connection recommendations to the users based on the calculated similarities between users.

As previously mentioned, the performance of the user connection discovery may be evaluated in an exemplary implementation for a user connection recommendation system. The recommendation is based on S, in which the problem is, for user, i, given S between user i and other users, the set of users that gives the higher chance to be connected with i. The list of recommended users are selecting based on the ranking of S, from the highest to the lowest. The evaluation is based on two common metrics, precision, p, and recall rate, r below:

$$p = \frac{T_p}{(T_p + F_p)} \tag{2}$$

where $T_p$ is the number of connected users in the recommended list while $F_p$ is the number of unconnected users in the recommended list. (Note: This was used for calculating the results depicted in FIGS. 7(A), 7(B), 10(A), and 10(B).) The sum of $T_p$ and $F_p$ is the number of recommended users. As the network work density of social networks are different, p is normalized by dividing the p of Rand, $p_{Rand}$:

$$\tilde{p} = \frac{p}{p_{Rand}} \quad (3)$$

Similarly, r is defined as:

$$r = \frac{T_p}{(T_p + F_n)} \quad (4)$$

where $F_n$ is the number of connected users that are not in the recommended list. (Note: Eq. 4 was used for calculating the results depicted in FIGS. 9(A)-(D).) The sum of $T_p$ and $F_n$ is the total number of connected users in a dataset. And r is normalized by dividing the r of Rand, Rr:

$$\tilde{r} = \frac{r}{r_{Rand}} \quad (5)$$

Higher values in $\tilde{p}$ and $\tilde{r}$ indicate that the performance is better in the discovery and recommendation. (Note: Eq. 3 and Eq. 5 were used for calculating the results depicted in FIGS. 8(A)-(F).) Table 2 below summarizes the user connection discovery results with the similarities obtained by different methods with the same procedure in this section.

TABLE 2

Summary of different methods of similarity calculation for connection and community discovery

| Approaches | Methods | Accessibility | Relative performance | Implementations and cost |
|---|---|---|---|---|
| SGs | FoF | Difficult and limited | Upper bound | Similarity is calculated based on the connections of users. This serves as an achievable bound for the case when user SGs are available |
| User shared Images | BoFT | Easy and reliable | Better than UserT | Similarity is calculated based on visual similarity of user shared images by BoFT, without using SGs |
| User annotated tags | UserT | Easy but unreliable | Better than Rand | Similarity is calculated by user annotated tags, a common method when the tags are available without using SGs. |
| Random | Rand | Simple but inaccurate | Lower bound | Similarity is set randomly, regardless of the SGs and the user shared images. It serves as a lower bound due to its simplicity. |

In step 8b, after the user profiles are obtained, the community discoverer 280b makes user community recommendations to the users based on the calculated similarities between users. The community discovery is based on the BoFT similarity among users by Eq. 1. $S(C_x, C_y)$, the similarity of 2 communities $C_x$ and $C_y$, is defined as the highest similarity between the users of the 2 communities:

$$S(C_x, C_y) = \max(S_{i,j}), \text{ where user } i \text{ is in } C_x, \text{user } j \text{ is in } C_y \quad (6)$$

Alternatively, the similarity between 2 communities can be calculated by other calculations, such as using the average similarity, i.e., mean($S_{i,j}$).

Based on $S(C_x, C_y)$, a common machine learning approach, hierarchical clustering, is adopted in the connection-based and image-based community discoveries. Among different hierarchical clustering algorithms, the agglomerative hierarchical clustering algorithm, which is a popular and implementable approach, is used to discover communities with a different number of desired communities. The steps for community discovery are shown in FIG. 2(C) and may include the following:

Step 8b.1—Similarity Calculation of the similarities among all users and each user is considered as a community.

Step 8b.2—Community Forming to combine the two communities that have the highest similarity.

Step 8b.3—Similarity Recalculation of the similarities between the newly combined community and other communities.

Step 8b.4—Checking total Number of Communities to repeat step 8b.2 until the desired number of communities is reached for the users.

The steps could be combined or shifted or adding new steps to the algorithm to obtain the same result.

By Eq. 6, the embodied method merges the two communities with the highest similarity into a single community, and then recalculates the similarities between the newly merged community and other existing communities. The embodied method may stop when the desired number of communities is reached, and then community assignment is obtained.

To evaluate the discovered communities with the ground truth, the community assignment obtained using the connections among the selected random users by the Louvain method. The discovery performance is evaluated by the normalized mutual information (NMI), which is defined as:

$$NMI(\Gamma_m, \Gamma_n) = \frac{-2\sum_{m=1}^{N_{Am}}\sum_{n=1}^{N_{An}} N_{m,n} \log((N_{m,n}N)/(N_m N_n))}{\sum_{m=1}^{N_{Am}} N_m \log(N_m/N) + \sum_{n=1}^{N_{An}} N_n \log(N_n/N)} \quad (7)$$

where N is the total number of users, $\Gamma_m$ and $\Gamma_n$ are 2 community assignments. $N_{Am}$ and $N_{An}$ denotes the number of communities in assignment m and n, respectively. The number of users in communities $C_x$ and $C_y$ are $N_m$ and $N_n$, respectively, while, $N_{m,n}$, is defined the number of common users in both $C_x$ and $C_y$. NMI ranges from 0 to 1, in which NMI=1 means the discovery result is identical to the ground truth, i.e., all the communities are discovered correctly. NMI=0 means that the 2 assignments are totally independent, in which 1 possibility is that all users are in the same community in community assignment An, while this is not the case for the other assignment Am. The community discovery results with the similarities obtained by other methods in Table 2 are also calculated with the same procedures in this section, and compared with other methods with NMI. (Note: Eq. 7 was used for calculating the results depicted in FIGS. 11(A)-(C).)

EXPERIMENTAL RESULTS

Exemplary embodiments of the invention were tested to demonstrate that user connections and communities can be discovered through user shared images from the eight social networks without using user SGs and user annotations. Discoveries can be made by obtaining user pairs who share many visually similar image, e.g., images of the same objects. Tables 1 shows the summary of involved datasets in this work, in which there are over 2 million images and 20 million user connections. The user connections and communities can be discovered from user shared images. Measurements can show that 2 users have a higher probability to be connected and in the same community if their shared images are similar. Experimental results demonstrate the effectiveness of the user connection and community discoveries using user shared images.

User Connection Discovery.

Figure 3:
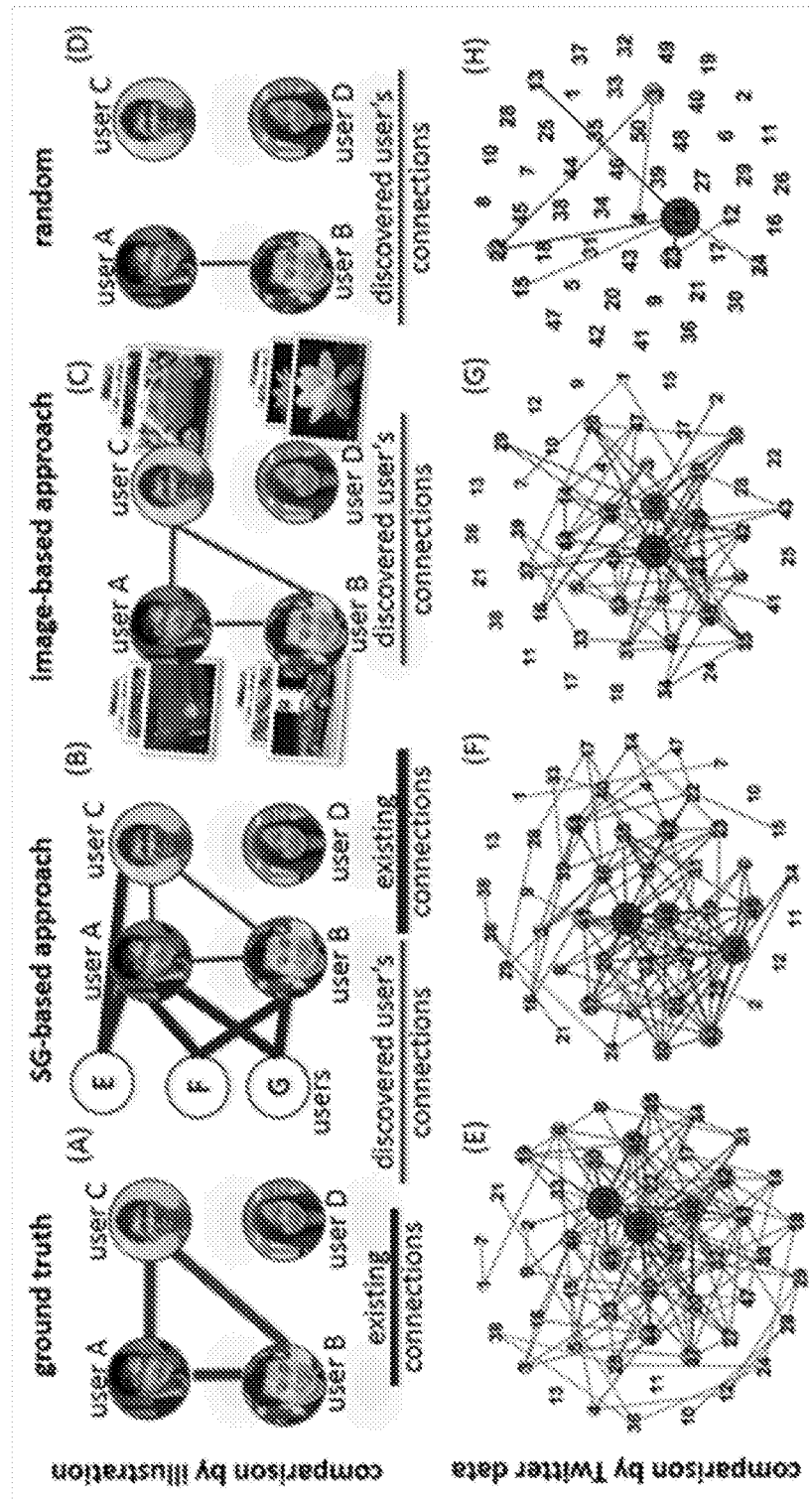
FIGS. 3(A)-(H) illustrate various approaches for discovering user connections and corresponding experimental results.

Connections can be discovered by analyzing the user connections from the user SGs and the user shared images. An example is presented in FIGS. 3(A)-(H) to show how user connections could be discovered using different approaches. FIG. 3(A) to (D) show the results from a set of 4 users, A, B, C and D, and FIG. 3(E) to (H) show a set of 50 Twitter™ users with their shared images. FIG. 3(A) shows the ground truth, which is the existing user connections among the 4 users, while FIG. 3(E) shows the ground truth among the 50 users. Two users with a connected line are those who are connected.

FIG. 3(C) to (H) show the discovered user connections, in which 2 users are connected with a line if their connection is successfully discovered. FIG. 3(B) is an example of user connection discovery using user connection similarity from the SGs of 4 users. Connections among users, A, B and C are discovered as they share common connected users, users E, F and G. A higher connection similarity between 2 users implies that the 2 users have more common connected users. FIG. 3(F) is an example of the discovered user connections with Twitter™ data by connection similarity. It can be observed that there are many discovered user connections. FIGS. 3(C) and (G) show examples of how user connections are discovered from user shared images. FIG. 3(C) is an example of user connection discovery using connection similarity from the SGs for 4 users. Connections among the 4 users, A, B and C are discovered as they share similar images. A number of user connections discovered from the 50 users are shown in FIG. 3(G). In order to benchmark the performance of different approaches, a random approach, that user pairs are picked randomly, is also illustrated in FIG. 3(D) and FIG. 3(H). It can be observed the user connection discovery using image is better than random. It indicates that user connections can be discovered based on the user shared images.

Community Discovery.

Figure 4:
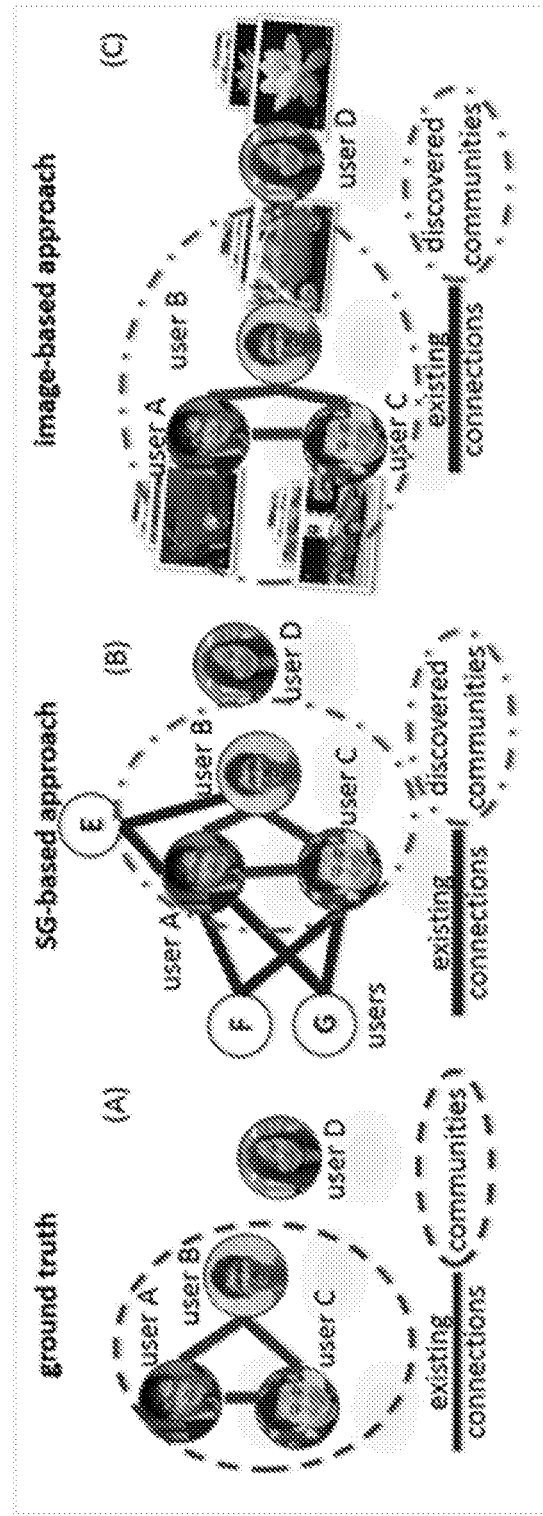
FIGS. 4(A)-(C) illustrate community information and experimental results corresponding to using different community discovery techniques.

Given a set of users, a good community discovery is able to assign an accurate number of communities and the membership of each community. FIGS. 4(A)-(C) show the community assignment after discovering the communities in an SG with 4 users, and examples of community assignments by different discovery approaches. FIG. 4(A) shows the ground truth, the discovered community assignment through the complete knowledge of SGs. It can be observed that there are more user connections among the users of the community with user, A, B and C. FIG. 4(B) shows how the community is discovered through an SG. As users A, B and C have more common connected users, they all have higher connection similarities than others. A connection-based community assignment can identify these users as being in the same community due to the higher connection similarity among them. Community discovery is also possible by analyzing shared images. A similar mechanism can be designed through shared images, as shown in FIG. 4(C): the users in the same community have a higher shared image similarity than others. The community can therefore be discovered as user A, B and C who share highly similar images, and the method of using image-based community assignment can be developed accordingly.

User Shared Images and Image Similarity.

The systems and methods of the embodiments of the present invention were used to analyze 2 million user shared images from eight social networks from the West and the East to discover user connections and communities. A Bag-of-Features (BoF)-based method is applied to analyze user shared images and calculate image similarity, which detects low-level and unique visual features by a Harris Affine detector, or Maximally Stable Extremal Regions detector. Any set of unique features can represent an object, an image in which the same object appears will have a highly similar set of unique features. Images with a highly similar set of unique features are assigned the same BoFT label to indicate that they are visually similar. 2 users with 2 sets of visually similar shared images will result in similar sets of BoFT labels, and the BoFT similarity can be calculated by Eq. 1. The connection similarity can also be calculated by a Friends-of-Friends (FoF) method with user SGs, resulting in the FoF similarity. The image-based and connection-based community assignment are obtained according to the two similarities, and result in BoFT-based and FoF-based community assignment respectively.

Figure 5:
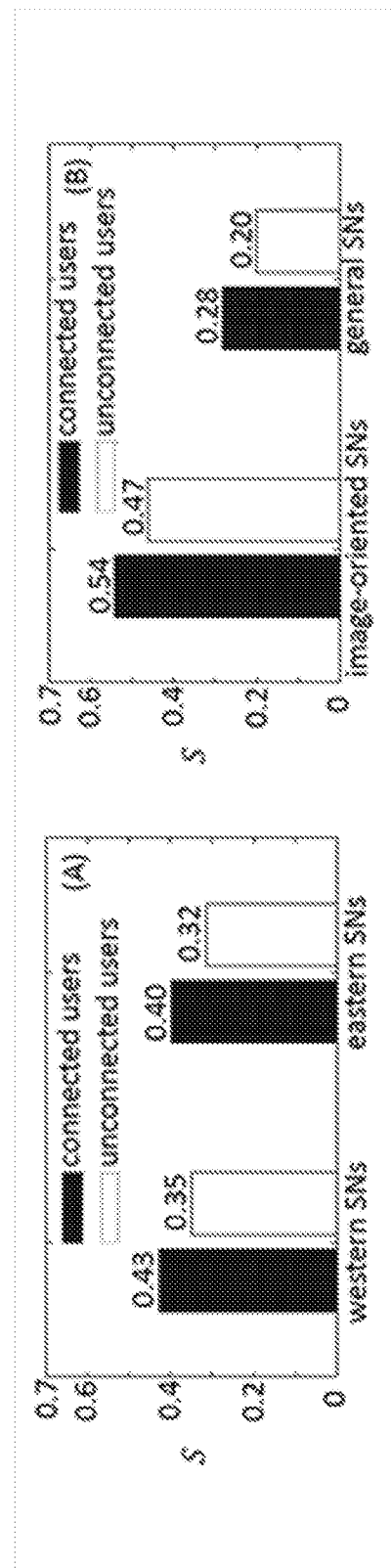
FIGS. 5(A) and 5(B) are graphs illustrating measurements of average BoFT similarity (S) across different social networks.

FIGS. 5(A) and 5(B) show the measurements of the average BoFT similarity (S) across different social networks shown in Table 1. FIG. 5(A) shows the comparison between connected and unconnected users by the average BoFT similarity across social networks from different origins, while FIG. 5(B) shows the comparison across different content sharing mechanisms. The results proved that connected users share highly similar images unlike those who are unconnected, independent of content sharing mechanisms and origins of the social networks.

Another experiment is conducted to verify if users in the same community share images that are more similar. The BoFT similarity of shared images among the users of the same community is measured, in which the communities are discovered using the user connections.

Figure 6:
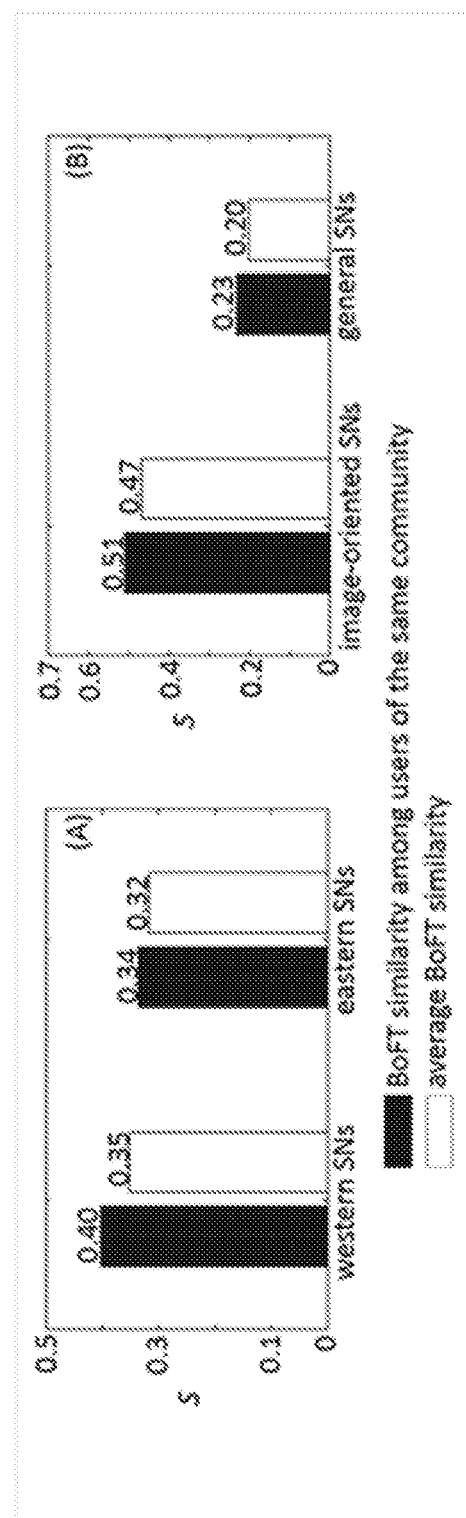
FIG. 6 are graphs illustrating average BoFT similarity of all user pairs from the same community and average BoFT similarity among all possible user pairs.
Figure 7:
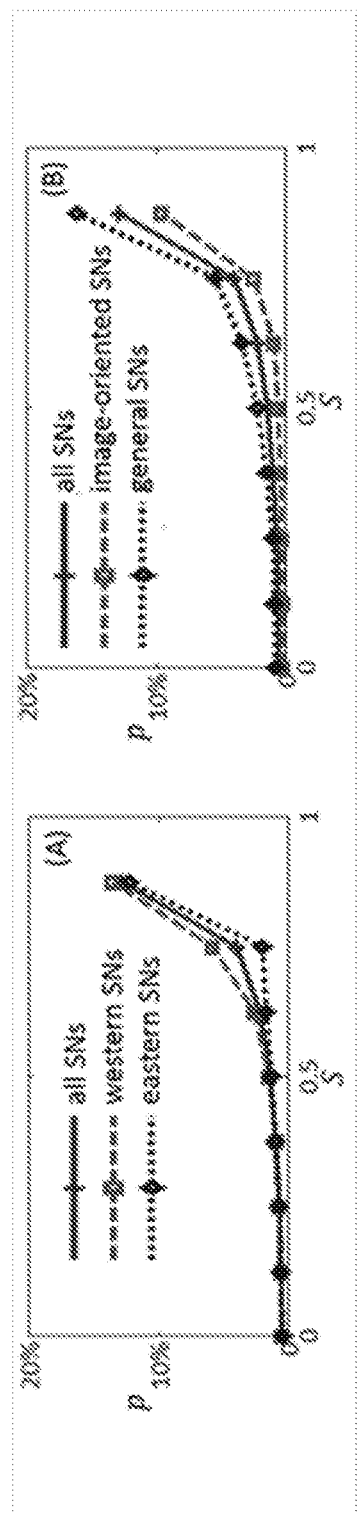
FIGS. 7(A) and 7(B) are graphs illustrating a comparison of average BoFT similarity (S) vs. precision (p) between the western and eastern social networks (FIG. 7(A)), and comparison of average BoFT similarity (S) vs. precision (p) between image-oriented and general social networks (FIG. 7(B)).

FIG. 6 shows the average BoFT similarity of all user pairs from the same community and the average BoFT similarity among all possible user pairs. It is confirmed that users from the same community have a higher BoFT similarity than the average BoFT similarity, and this phenomenon is independent of the content sharing mechanisms and the origins of the social networks. In all western social networks, the BoFT similarity among the users of the same community is 14.3% higher than the average BoFT similarity. For those eastern social networks, the BoFT similarity is 5.9% higher than the average BoFT similarity. In image-oriented social networks, the BoFT similarity among the users of the same community is 8.5% higher than average BoFT similarity. The BoFT similarity is 15% higher than the average BoFT similarity in general social networks. In the experiment above, it is confirmed that connected users share images that are more similar compared with those who are unconnected, and the users of the same community share images that are more similar. This phenomenon is proven to be independent of the origins and the content sharing mechanisms of the social networks. Based on this conclusion, it is possible to discover connections and communities by methods using BoFT similarity.

BoFT Similarity and user connections.

Another investigation was performed as to how the BoFT similarity, S, between 2 users is useful in telling if 2 users are connected. An experiment is conducted to discover user connections based on S, by predicting user pairs with different values of S are connected. The prediction performance is measured by the precision, p, the percentage of the discovered connections that exist in the ground truth, as defined by Eq. 2.

FIGS. 7(A) and 7(B) show comparison of average BoFT similarity (S) vs. precision (p) between the western and eastern social networks (FIG. 7(A)), and comparison of average BoFT similarity (S) vs. precision (p) between image-oriented and general social networks (FIG. 7(B)), according to embodiments of the present invention.

FIG. 7(A) compares S against p over the western and eastern social networks, while FIG. 7(B) compares S against p over image-oriented and general social networks. It can be observed that p increases with S. The result implies two users have a higher probability to be connected if they have a higher BoFT similarity of their shared images. The same phenomenon occurs across different origins and content sharing mechanisms of the social networks. As there are no user pairs who share exactly the same images, the case of S=1 is not plotted in FIGS. 7(A) and 7(B). In FIGS. 7(A) and 7(B), western SNs and general social networks have a better performance in p as they have a higher network density as shown in Table 1. These results prove that user connections can be discovered with methods using BoFT similarity.

Connection Discovery Using BoFT Similarity.

Based on the observation that connected users share images that are more similar, user connections can be therefore discovered using the BoFT similarity of user shared images. This experiment evaluates the proposed discovery method by a common approach, a recommendation system on connections. The discovery starts from user pairs with high BoFT similarity value and progresses to the lower value, as a higher similarity implies a higher probability that they are connected. Three other methods are also implemented for comparative evaluation, as listed in Table 2.

The first method is FoF, in which user connections are discovered by its similarity by their SGs as an achievable upper bound when the difficult and limited access to SGs are available. The second one is using user annotated tags (UserT), in which user connections are discovered by its similarity of the user annotated tags on the shared images between 2 users. The third method is a random method (Rand), in which user connections are discovered based on a randomly assigned similarity value to all possible user pairs, as in FIG. 3(E). This serves as a baseline, or the lower bound, for all evaluation due to the simplicity. The evaluations are conducted on the eight social networks in Table 1 individually.

The results are evaluated by 2 common metrics of prediction performance, recall rate r and precision rate p, as defined by Eq. 4 and Eq. 2. The recall rate, r, is the percentage of the existing user connections in the ground truth that are discovered. They are evaluated by the top N users with the highest similarities, S. A better method should give higher values of p and r.

As the discovery on a social network with a high density gives high r and p, the 2 values are normalized into $N_r$ and $N_p$ by dividing them with r and p of Rand, respectively, as shown in Eq. 3 and Eq. 5.

Figure 8:
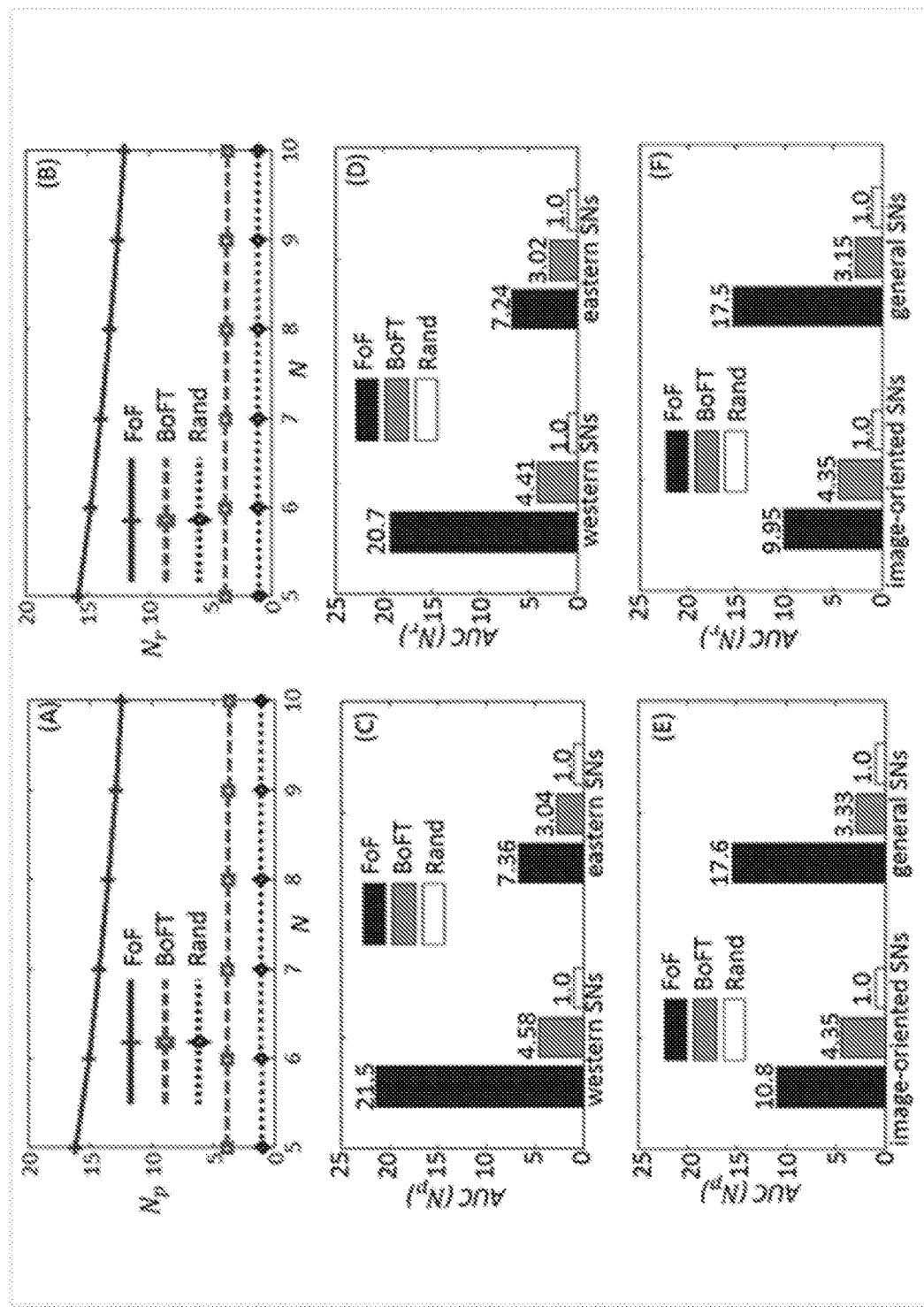
FIGS. 8(A)-(F) are graphs illustrating comparisons of results of different methods.

FIGS. 8(A) and (B) show the $N_p$ and $N_r$ of different methods against N. The range of N is set to be 5 to 10 to simulate the typical setting of user connection recommendation systems. It can be observed that the proposed method is at least 4 times better than Rand, and achieves 25.8% of the performance of FoF. To evaluate the performances of the eight social networks, the area under the curves (AUC) for N equals to 5 to 10 per user are calculated, for which a higher AUC implies a better discovery performances. FIGS. 8(C) and (D) show the comparison of AUC across different origins of the social networks. From FIG. 8(C), BoFT for p achieves 21.3% of FoF for western social networks, and 41.3% for those eastern social networks. The same observation is found in FIG. 8(D) for r. BoFT for r achieves 21.3% and 41.7% of the AUC of FoF for western and eastern social networks, respectively. FIGS. 8(E) and (F) compare the performances on different content sharing mechanisms of social networks. In FIG. 8(E), BoFT achieves 37.9% and 19.2% of the AUC value of FoF in image-oriented and general social networks, respectively. The same observation can be found in r of FIG. 8(F). BoFT has 41.8% of FoF's AUC value in an image-oriented social network, and 18.4% for general social networks.

As discussed, an SG is generally difficult to be accessed, therefore using user annotated tags is indeed a common alternative today for discovering user connections in many social networks, such as Flickr™, today.

Figure 9:
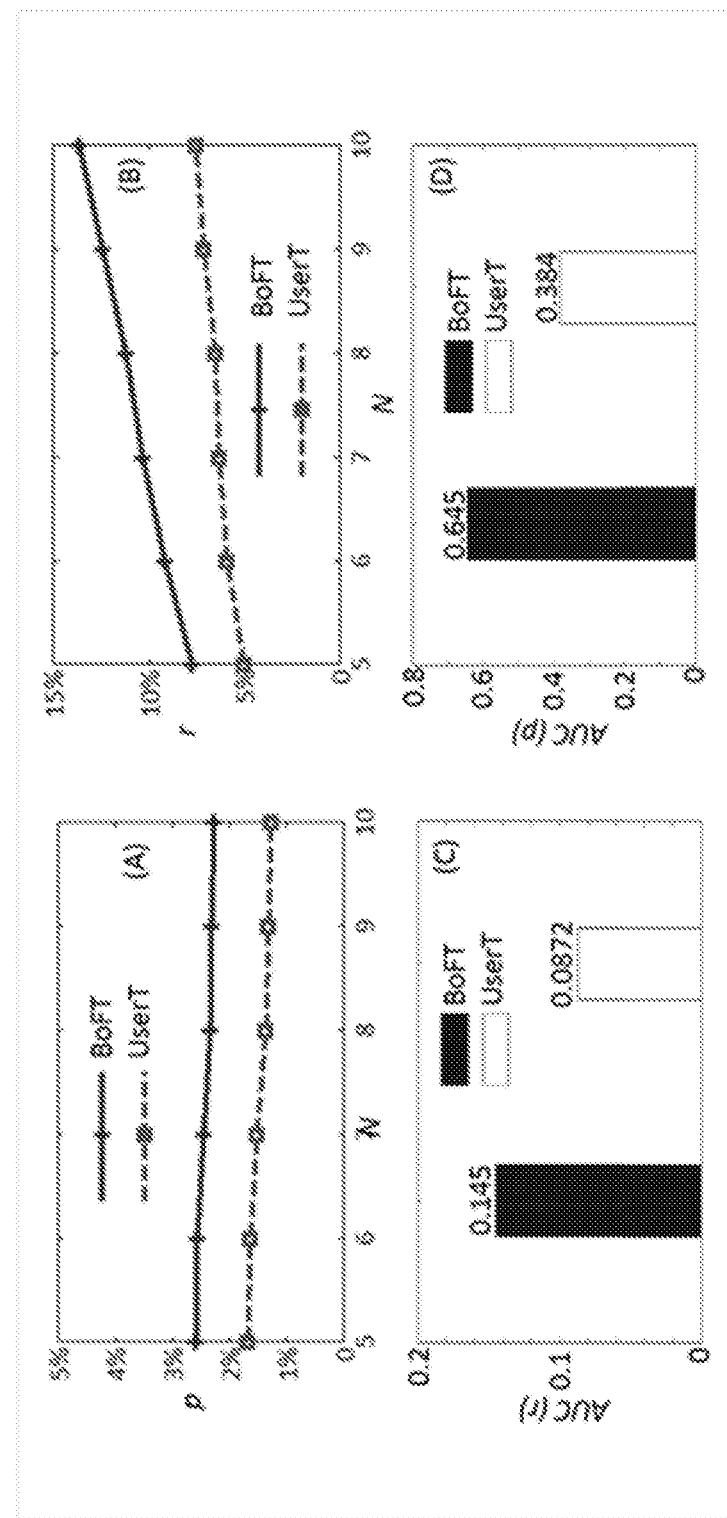
FIGS. 9(A)-(D) are graphs illustrating precision (p) and recall rate (r) for 5 to 10 recommendations.

Hence, a comparison between results of UserT and the proposed method of the present invention is shown in FIGS. 9(A)-(D) using the dataset with over 200,000 images from Flickr™, which could tell the performance of user connection discovery can be improved for a photo-oriented social network like Flickr™. FIG. 9(A) shows p and FIG. 9(B) shows r for the 5 to 10 recommendations. The proposed BoFT method performs better than UserT, which could be a better alternative for today's social networks when an SG is inaccessible. FIG. 9(C) and FIG. 9(D) show the AUC of FIG. 9(A) and FIG. 9(B), respectively. The results proved that the proposed method is 65% better than UserT in terms of p and r on Flickr™

BoFT Similarity and Community Membership. Similarly, based on the phenomenon that users of the same community share highly similar images, an experiment is carried out to evaluate community discovery based on S, by predicting user pairs with different values of S are in the same community.

Figure 10:
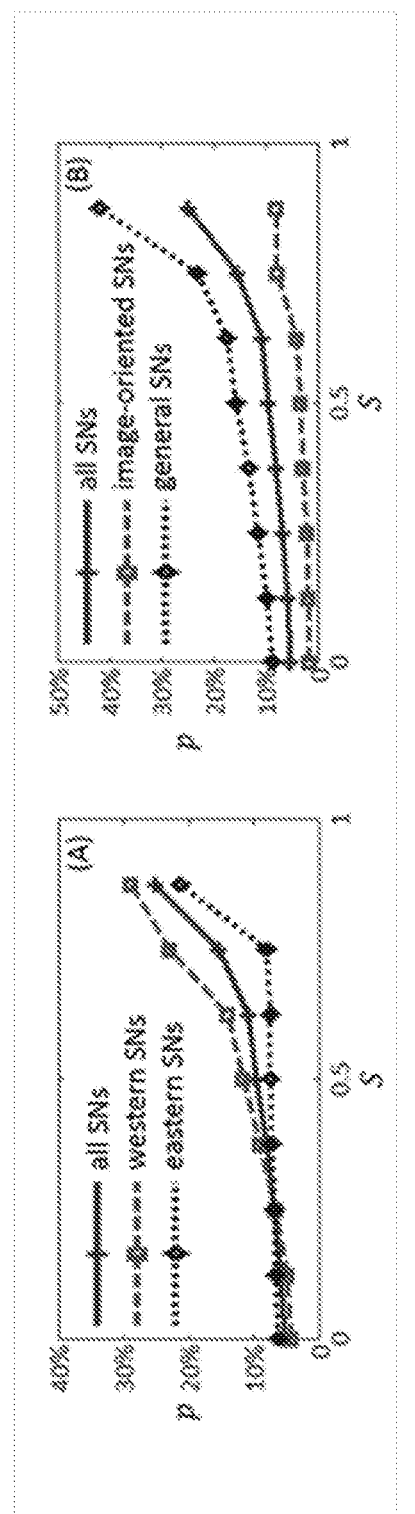
FIGS. 10(A) and 10(B) are graphs illustrating comparisons of average BoFT similarity (S) vs. precision (p) between the origins and the mechanisms of social networks.

FIGS. 10(A) and (B) compare S against p over the origins and the mechanisms of social networks, respectively. It is proved that p increases with S. The results prove that when the shared images of 2 users are more similar, they have a higher probability of being in the same community. This phenomenon occurs across different origins and content sharing mechanisms of the social networks. As there are no user pairs who share exactly the same images, found in the social networks the case of BoFT similarity of 2 users, S=1, is not plotted in FIGS. 10(A) and (B). The results imply that community can be discovered with the use of BoFT similarity, which will be discussed below with a proposed method. Comparing with the FIG. 7, FIGS. 10(A) and (B) show a higher p given the same S. The reason behind is that the community is just a set of user with more user connections, the users of the same community are not necessary to be fully connected. As a result, the number of user pairs from the users of the same community is much higher than user pairs who are connected, and p is much higher in FIGS. 10(A) and (B). Similarly, in FIGS. 10(A) and (B), western SNs and general social networks have a better performance in p as they have a higher network density as shown in Table 1.

Community Discovery using BoFT Similarity. Based on the phenomenon that users in the same community share highly similar images, communities can be therefore discovered by using the BoFT similarity from user shared images. The discovery is conducted by grouping users who share similar images, from the highest similarity to the lowest, as a user pair is more likely to be in the same community if their shared images are similar. In this experiment, an iterative hierarchical clustering method, which merges communities based on their similarities by Eq. 6, is adopted to obtain the community assignment. In the first iteration, each user is considered as a community. The 2 most similar communities are merged to a new community and the similarities between the newly merged community and other communities are recalculated until reaching a desired number of communities, subject to the applications. The performance of the assignment is evaluated by the ground truth, the communities' assignment discovered by the existing connections among the users.

A measurement that compares the differences of all possible pairs of communities between 2 assignments, normalized mutual information (NMI) from information theory, is adopted. When NMI=1, the BoFT-based community assignment is the same as the ground truth, while NMI=0 when the assignment is totally different from the ground truth, e.g., all the users are in the same community. FoF-based community assignment, which is discovered with FoF similarity by the same hierarchical method as above, is also obtained for the evaluation. However, as NMI generally gives a higher value when there are more communities in an assignment.

Figure 11:
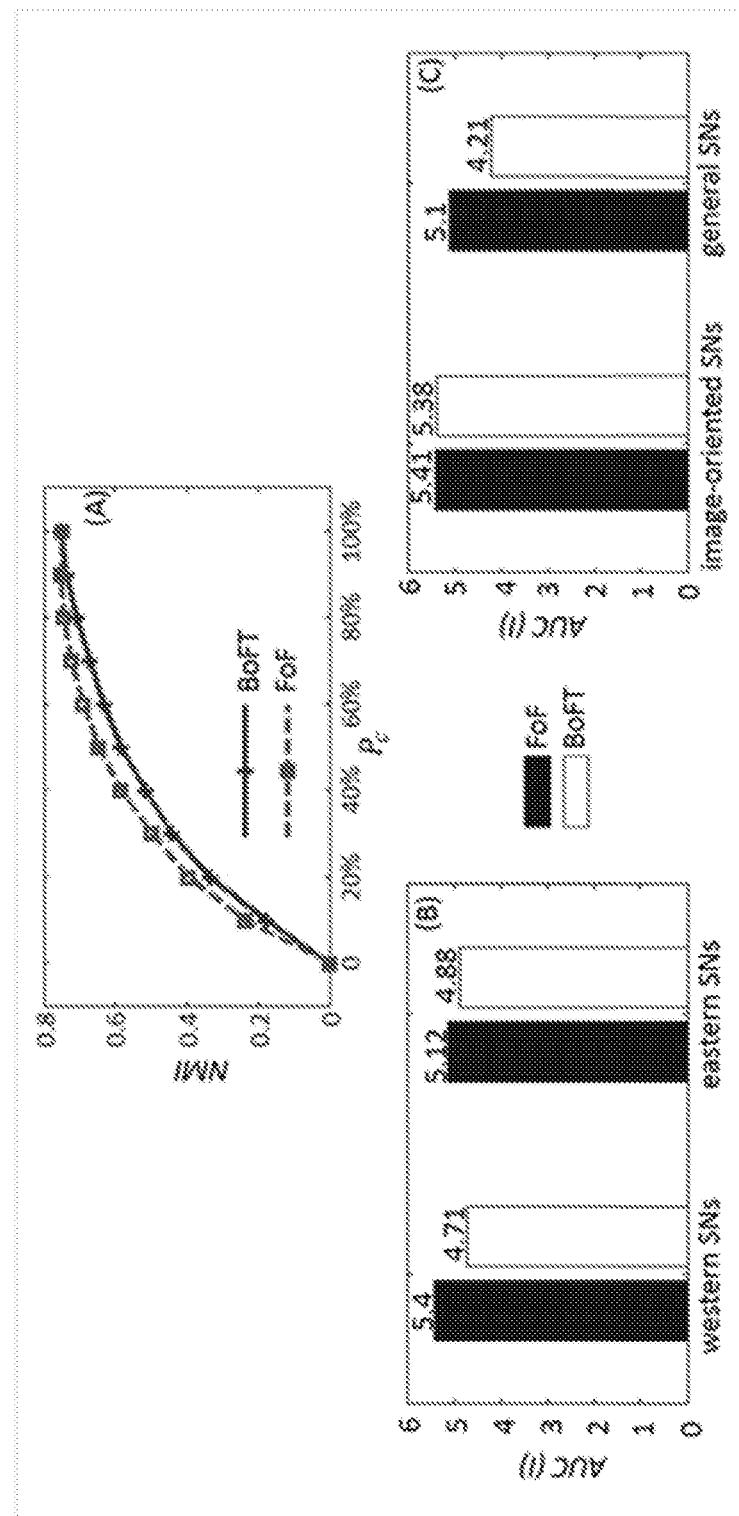
FIGS. 11(A)-(C) are graphs illustrating comparisons of the performance of different methods with the same number of communities discovered.

FIGS. 11(A)-(C) shows comparison of the performance of different methods with the same number of communities discovered, according to embodiments of the present invention. The results of the evaluation are shown in FIGS. 11(A)-(C) with the x-axis, Rc, as the number of community discovered, normalized by the maximum possible number of communities. For example, when there are 40 users, the possible maximum number of communities is 40. If 20 communities are discovered, Rc is 50%.

From FIG. 11(A), it can be observed that the BoFT-based community assignment achieves a similar performance to FoF-based community assignment. FIGS. 11(B) and (C) shows the AUC in NMI across social networks from different origins and mechanisms. From FIG. 11(B), it can be observed that the BoFT-based community assignment has a similar performance to the FoF-based community assignment. The BoFT-based assignment can achieve 87.2% of what FoF-based assignment does for western social networks, and 95.3% for those eastern social networks. From FIG. 11(C), it can be observed that the proposed method generally achieves a comparable performance to FoF-based assignment in image-oriented social networks. The proposed method achieves 99.4% in AUC of what FoF-based assignment does by image-oriented social networks, and 82.5% on the general social networks. The results show that BoFT similarity performs well for community discovery. One of the reasons behind this is that the proposed method in community discovery considers the similarities of multiple users. These similarities among users provide richer information than the similarity of 2 users only, as used in FoF. The results proved that BoFT-based community assignment can achieve a comparable performance to FoF-based community assignment, regardless of the number of communities to be discovered.

According to embodiments of the present invention, a BoF based Tagging approach can make better recommendations matching users interests discovered from images uploaded. The BoF based approach can help discover hidden users' connections from the shared images on a social network for a better recommendation. As user friendship/interests are not always available, the unsupervised approach can classify image according to their visual features. Those visual features represent the user interest, and hence recommendation. The exemplary embodiment is evaluated by friendship recommendation with a scraped dataset from Flickr™ with over 500 users and 200,000 images. The exemplary embodiment can recommend friendship to user based on the image shared by the users. The recall and the precision rate are improved by about 50%.

An exemplary implementation of non-user-generated label assignment is provided as follows.

Non-user generated labels are generated based on the visual features and the characteristics of the images. It can be based on any image processing/computer vision techniques that can tell the similarity of two images. For example, approaches that tell the names of the objects appear on an image can be non-user generated. In an embodiment, it has been demonstrated that using a signal processing approaches, BoFT that uses a common computer vision technique, BoF (Bag-of-Features) can generate non-user generated labels for connection discovery. Two images with the same non-user generated labels indicate that they are visually similar, such as the object appears on both images. The number of occurrences of the non-user generated labels of the shared images of a user is used as his/her user profile. There are five steps to generate the non-user generated labels:

Feature Extraction. These unique features can be detected by feature detection. The extracted features of the same object are relatively consistent across images taken under different viewing angles and lighting conditions. They are represented in a way that is independent of the size and orientation, for example, using scale-invariant feature transform (SIFT). The representation of SIFT is a 128 dimensions vector, in which there are multiple features on an image. Alternatively, any feature descriptor, such as GIST descriptor and convolutional neural network (CNN) are also applicable to this part. FIG. 12 is a screenshot depicting an example of a feature in SIFT.

Figure 14:
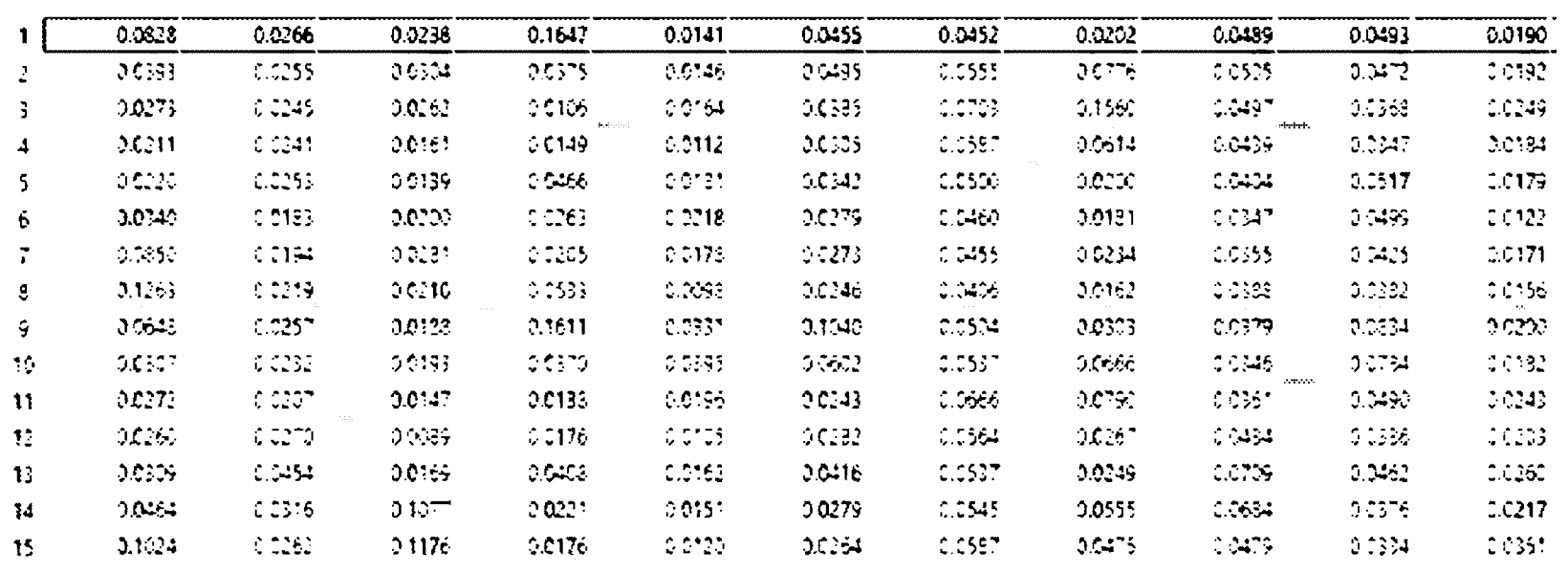

Codebook Generation. This step starts with clustering extracted visual features into groups by clustering techniques such as k-mean clustering based on their visual similarity, and the mean vectors of each group are defined as a visual word. It has the same number of dimensions as a feature in SIFT. FIG. 13 is a screenshot depicting an example of a visual word. FIG. 14 is a screenshot depicting an example of multiple visual words generated from k-means. Alternative techniques for generating the visual words include using the Canopy clustering algorithm and the Linde-Buzo-Gray algorithm.

Figure 15:
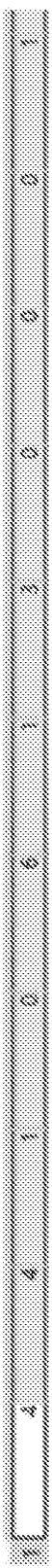
FIG. 15 is a screenshot depicting a feature vector for an image.

Feature Coding and Pooling. Feature coding represents each visual features by the closest visual word. It is a vector distance calculation. Each feature in an image is compared to the mean vector from codebook generation and is assigned to that group. The images are then represented by a feature vector in the feature pooling. One way of performing the feature pooling is counting the number of occurrences of each unique visual word on an image as the feature vector of the image for comparing the similarity of images. FIG. 15 is a screenshot depicting a feature vector for an image. Each image may be represented as a feature vector, for example, similar to the vector shown in FIG. 15.

Clustering. As the images with the same objects have similar visual features, these images have similar feature vectors. Clustering is the process to group images based on their similarity. Each cluster obtained by clustering feature vectors corresponds to a set of visually similar images. The step is an unsupervised operation, meaning user shared images are analyzed without any manual inputs and processes. In one example, the similarity calculation is based on cosine similarity from the feature vector. It will be appreciated however, the similarity calculation is not limited to cosine similarity; in other exemplary embodiments, other similarity calculations, such as Jaccard similarity, are also possible. For the clustering, a standard clustering technique, such as k-means, may also be used, as well as other clustering techniques.

Non-user generated label assignment using BoFT Labels. The next step, tagging with a BoFT label, assigns each cluster a BoFT label such that those images with the same BoFT labels are visually similar.

It will be appreciated that, as discussed above, the above-described exemplary framework is not limited to the specific techniques used in each step. For example, other feature extraction techniques, such as the Harris Affine detector, Maximally Stable Extremal Regions detector and Kadir-Brady saliency detector, are also applicable for feature extraction to the framework. Feature coding and pooling can be skipped if there is another approach that can compute image similarity based on the feature extracted directly. Clustering can use different classification techniques, such as K-NN, and other supervised techniques, such as support vector machine if a training dataset is available.

In other exemplary embodiments, other techniques that do not rely on feature extraction, codebook generation, feature coding and pooling, and clustering, may also be used. For example, techniques such as template matching can be used to recognize objects without feature extraction, and the names of the recognized objects can serve as non-user generated labels for the tagging and profile-generation steps.

Figure 16:
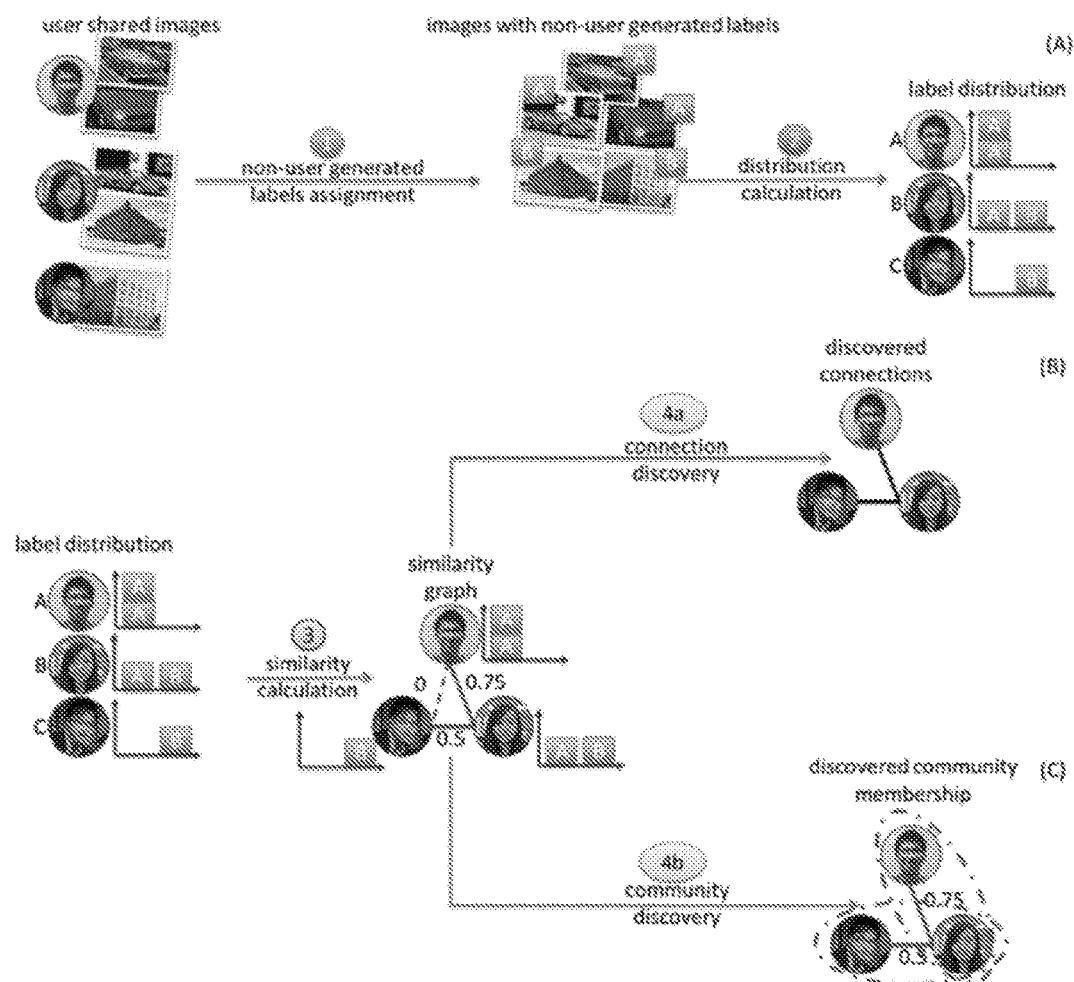
FIG. 16 is a flowchart depicting an exemplary process flow for an image analysis system in an exemplary embodiment.

FIG. 16 is a flowchart depicting an exemplary process flow for an image analysis system in an exemplary embodiment where non-user-generated labels can be generated directly from the user shared images, for example, via template matching. The system provides: (A) non-user-generated label assignment on user shared images and the distribution of the non-user-generated labels being used to represent users; (B) connection discovery based on the similarity calculation based on the distribution of non-user generated labels; (C) community discovery based on the similarity calculation based on the distribution of non-user generated labels.

It will be appreciated that, in this example, the label distributions being used to represent the users corresponds to counting the occurrence of each non-user-generated label for each user. Alternatively, the label can be distributions generated by any function, and the label distribution can be calculated based on those distributions of labels, such as the weighted sum. An example is, the distribution of label 1 and label 2 are {1, 1, 1} and {0.5, −0.5, 0}, respectively. A user with two instances of label 1 and one instance of label 2 will have a distribution of {2.5, 1.5, 2}.

Figure 18:
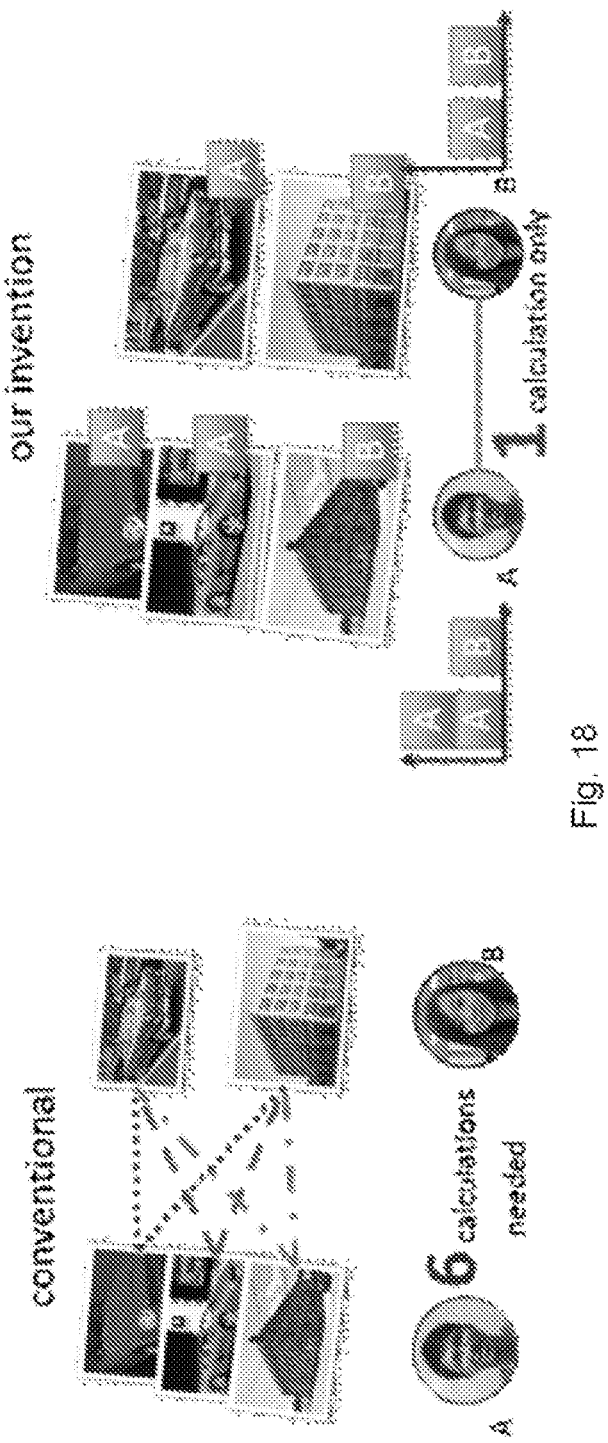
FIG. 18 is a diagram illustrating a number of calculations utilized by an exemplary implementation compared to a number of calculations utilized by a conventional approach.

Using the distribution obtained from non-user generated labels to provide a scalable calculation on similarity between users, such as using the BoFT labels in the following figure. For example, there are many calculations in conventional approaches (e.g., 6 calculations for only 5 images and 2 user), while there is only one calculation in the proposed approach (see FIG. 18).

Figure 19:
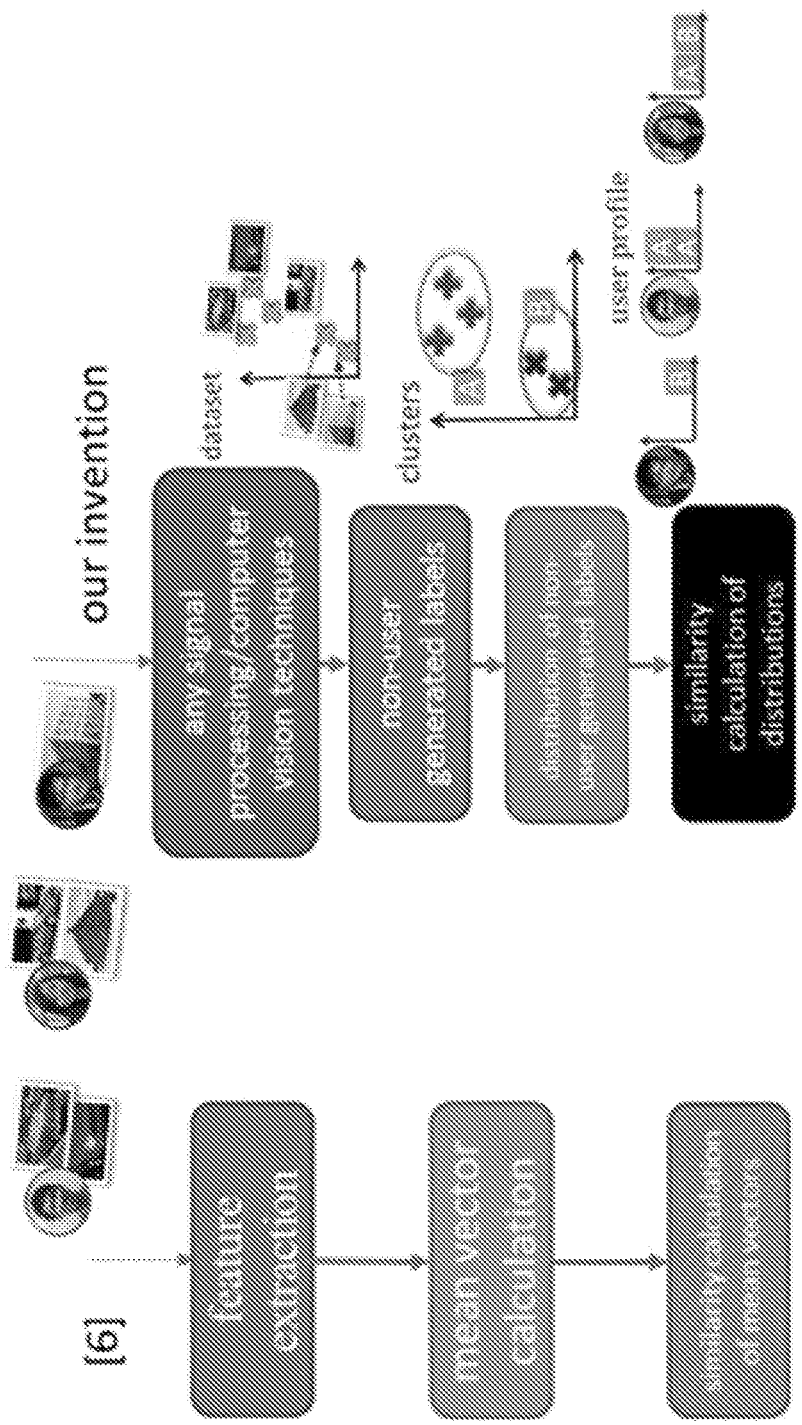
FIG. 19 is a diagram illustrating a process flow utilized by an exemplary implementation compared to a process flow utilized by a conventional approach.

In "US2012297038 (A1)—Recommendations for Social Network Based on Low-Rank Matrix Recovery", they make use of the mean feature vector of the shared images of each user to represent user as in the following figure. It is a special case of our invention, by consider each feature vector as a unique BoFT label, and using the feature vector as the distribution of that label (see FIG. 19).

An exemplary experiment with respect to gender identification based on user profiles, for example, using data from Flickr, is discussed as follows.

Figure 17:
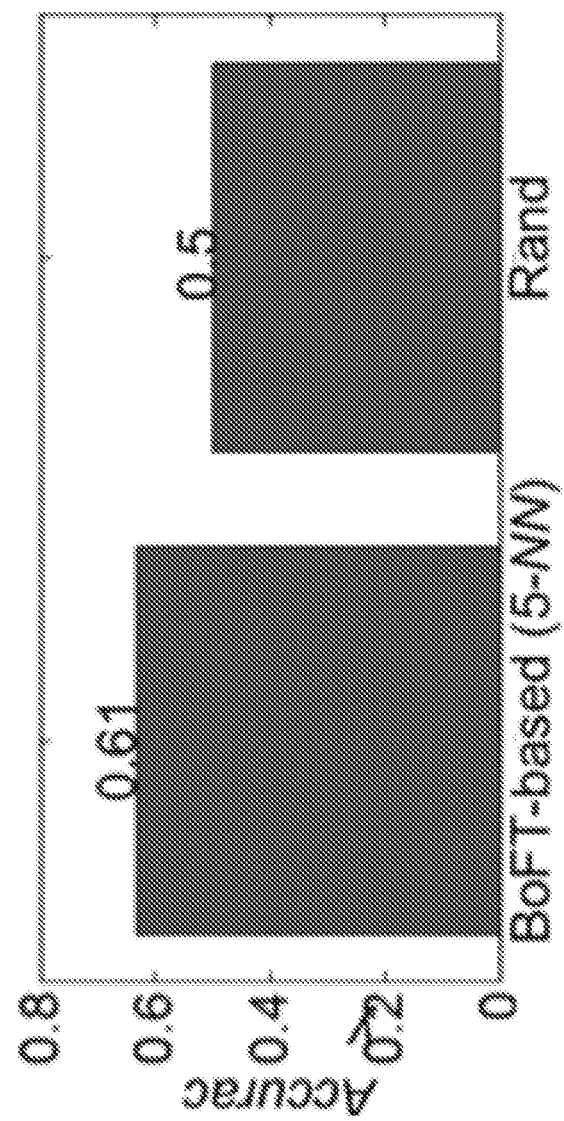
FIG. 17 is a graph depicting the averaged accuracy result with respect to gender identification relative to a random determination.

Profiles on social media are also important for applications but not always available. Among the information in profiles, gender is interesting as it is useful for recommendation. Another showcase using a new Flickr dataset with over 1.6 million images is conducted to show how gender can be identified with discovered connections. 1311 out of the 1414 users provide their gender, of which there are 371 females and 940 males. In each trial, 500 users are selected randomly and $S_1$ is calculated. The experiment uses K-NN with K=5 and 11, in which the gender of the top 5/11 users, with highest $S_x$, with user i, is predicted as the gender of user i, and verified by the ground truth. 1000 trials were conducted, and FIG. 17 is a graph depicting the averaged result relative to a random determination. It was thus demonstrated that gender identification is possible with discovered connections, and is 42% better than random guessing.

It will be appreciated that other applications, such as virality prediction, community detection, and tie strength calculation, are achievable as well.

Exemplary advantages of the systems and methods described herein include efficiency and scalability, as the systems and methods described herein are able to achieve a determination of similarity between users in a relatively efficient manner. For example, while a conventional system may need many calculations between various images to arrive at a similarity score between two users, the described systems and methods are able to achieve a similarity score based on a single calculation between two user profiles. This is particularly advantageous with respect to applications involving social networks, which may involve an extremely large number of images and users.

Further exemplary advantages of the systems and methods described herein include flexibility and the depth of analysis. Conventional approaches to analyzing images often follow rigid feature extraction and analysis algorithms that cause information to be lost, while embodiments of the label-generation and user profile system described herein are able to utilize non-user-generated labels that provide relatively more information and are able to represent more different types of image objects/features.

Further, because embodiments of the systems and methods described herein are able to identify objects in images, and to identify connections between users therefrom, information associated with those users can be used for a wide variety of applications. For example, if one user is known to be living in one city and the location of another user is unknown, but the two users share visually similar images, the another user's living location can be inferred to be the same as the first user. Other exemplary applications include but are not limited to discovery of follower/followee relationships, community discovery, and gender identification, all without using social graphs or user-annotated tags.

It will be appreciated that, in exemplary embodiments, the user images include images generated by user from user-related devices or smart devices via image taking, such as mobile phones and cameras; drawing, such as mobile applications; screen capturing, such as from mobile phones; receiving from others, such as from instant messaging applications; liked/shared, such as images from social media; saved, such as images from social media or web browsing.

It will be appreciated that, in exemplary embodiments, the user images include images generated by users from cameras of user-related devices or smart devices, wherein the user-related devices or smart devices include: smartphones, wearable devices, and/or human control devices.

It will be appreciated that, in exemplary embodiments, the user images include images taken by cameras and stored in digital formats, whether or not they are readable by humans, such us infra-red images.

It will be appreciated that, in exemplary embodiments, the user images include images captured from videos (e.g., videos including a sequence of images).

It will be appreciated that, in exemplary embodiments, the visual features include color, edges, textures, region, objects and faces, and/or other unique feature descriptor such as SIFT, GIST or other computer vision, image/signal processing techniques.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for using images generated or shared by a plurality of entities to output associations between entities of the plurality of entities, comprising:
   one or more processor-readable media, configured to store processor-executable instructions; and
   one or more processors, configured, based on execution of the stored processor-executable instructions, to facilitate:
      extracting visual features of the images generated or shared by the plurality of entities, wherein each image is generated or shared by a respective entity of the plurality of entities;
      annotating the images generated or shared by the plurality of entities with non-user-generated labels based on the extracted visual features, wherein the non-user-generated labels are machine-generated based on a machine analysis of the extracted visual features;
      generating a label-based representation for a first entity based on a plurality of non-user-generated labels associated with images generated or shared by the first entity;
      generating a label-based representation for a second entity based on a plurality of non-user-generated labels associated with images generated or shared by the second entity;
      comparing the label-based representation for the first entity and the label-based representation for the second entity to determine whether or not they are similar;
      determining an association between the first entity and the second entity in response to determining that the label-based representation for the first entity and the label-based representation for the second entity are similar; and
      outputting the determined association between the first entity and the second entity.

2. The system according to claim 1, wherein the images comprise at least one of the following:
   images generated by users from user-related devices or smart devices via image taking, drawing, screen capturing, receiving, liking, sharing, and/or saving;
   images generated by users from cameras of user-related devices or smart devices, wherein the user-related devices or smart devices include: smartphones, wearable devices, and/or human control devices;
   images taken by cameras and stored in one or more digital formats; and/or
   images captured from videos.

3. The system according to claim 1, wherein the one or more processors are further configured to facilitate:
   converting the visual features of the images into visual words representing the extracted visual features;
   encoding each image with at least one feature vector based on the visual words and the extracted visual features corresponding to the visual words associated with the image;

clustering images into multiple groups based on the feature vectors corresponding to the images; and generating at least one non-user-generated label corresponding to each group of the multiple groups.

4. The system according to claim 3, wherein clustering the images into multiple groups is further based on the images having similar elements; and wherein each group of the multiple groups is represented by the at least one non-user-generated label corresponding to the group.

5. The system according to claim 3, wherein clustering the images into multiple groups is further based on pre-definitions of the multiple groups; and wherein each group of the multiple groups is represented by at least one unique non-user-generated label obtained based on the images.

6. The system according to claim 1, wherein the visual features comprise color, edges, textures, region, objects, faces, and/or other unique feature descriptors based on Scale-invariant feature transform (SIFT), GIST or other computer vision, image/signal processing and machine learning techniques.

7. The system according to claim 1, wherein extracting the visual features utilizes at least one of the following: a Harris Affine detector, a Maximally Stable External Regions detector, a Kadir-Brady saliency detector, or a Scale-invariant feature transform (SIFT).

8. The system according to claim 7, wherein a unique visual word is generated from a set of features as a feature representation.

9. The system according to claim 8, wherein each visual word is represented by combining corresponding features of the images.

10. The system according to claim 3, wherein each feature vector corresponds to a number of occurrences of each visual word in each image.

11. The system according to claim 3, wherein clustering the images into multiple groups is further based on similarities between feature vectors of the images being clustered, such that images that are more similar are more likely to be in the same group.

12. The system according to claim 4, wherein the similarity calculation is based on cosine similarity.

13. The system according to claim 1, wherein the label-based representation for each respective entity is a distribution of non-user-generated labels for each respective entity indicative of a number of occurrences of unique non-user-generated labels associated with the images corresponding to the respective entity.

14. The system according to claim 1, wherein the label-based representation for each respective entity is determined based on a transform function corresponding to multiple labels.

15. The system according to claim 1, wherein outputting the determined association between the first entity and the second entity further comprises:

identifying or recommending a connection between the first and second entit.

16. The system according to claim 15, wherein the identification or recommendation of the connection is conducted without utilizing social graphs or user-annotated tags.

17. The system according to claim 15, wherein one or more social graphs or user-annotated tags are used to enhance the results of the identifying or recommending.

18. The system according to claim 1, wherein outputting the determined association between the first entity and the second entity further comprises:

identifying or recommending a user community for the first entity or the second entity.

19. The system according to claim 1, wherein outputting the determined association between the first entity and the second entity further comprises:

identifying a characteristic of the first entity or the second entity.

20. One or more non-transitory processor-readable media having processor-executable instructions stored thereon for using images generated or shared by a plurality of entities to output associations between entities of the plurality of entities, wherein the processor-executable instructions are executable by one or more processors to facilitate the following steps:

extracting visual features of the images generated or shared by the plurality of entities, wherein each image is generated or shared by a respective entity of the plurality of entities;

annotating the images generated or shared by the plurality of entities with non-user-generated labels based on the extracted visual features, wherein the non-user-generated labels are machine-generated based on a machine analysis of the extracted visual features;

generating a label-based representation for a first entity based on a plurality of non-user-generated labels associated with images generated or shared by the first entity;

generating a label-based representation for a second entity based on a plurality of non-user-generated labels associated with images generated or shared by the second entity;

comparing the label-based representation for the first entity and the label-based representation for the second entity to determine whether or not they are similar;

determining an association between the first entity and the second entity in response to determining that the label-based representation for the first entity and the label-based representation for the second entity are similar; and outputting the determined association between the first entity and the second entity.

21. The one or more non-transitory processor-readable media according to claim 20, wherein the processor-executable instructions are further executable by the one or more processors to facilitate the following steps:

converting the visual features of the images into visual words representing the extracted visual features;

encoding each image with at least one feature vector based on the visual words and the extracted visual features corresponding to the visual words associated with the image;

clustering images into multiple groups based on feature vectors corresponding to the images; and generating at least one non-user-generated label corresponding to each group of the multiple groups.

22. A method for using images generated or shared by a plurality of entities to output associations between entities of the plurality of entities, comprising:

extracting, by one or more processors, visual features of the images generated or shared by the plurality of entities, wherein each image is generated or shared by a respective entity of the plurality of entities;

annotating, by the one or more processors, the images generated or shared by the plurality of entities with non-user-generated labels based on the extracted visual features, wherein the non-user-generated labels are machine-generated based on a machine analysis of the extracted visual features;

generating, by the one or more processors, a label-based representation for a first entity based on a plurality of non-user-generated labels associated with images generated or shared by the first entity;

generating, by the one or more processors, a label-based representation for a second entity based on a plurality of non-user-generated labels associated with images generated or shared by the second entity;

comparing, by the one or more processors, the label-based representation for the first entity and the label-based representation for the second entity to determine whether or not they are similar;

determining, by the one or more processors, an association between the first entity and the second entity in response to determining that the label-based representation for the first entity and the label-based representation for the second entity are similar; and outputting, by the one or more processors, the determined association between the first entity and the second entity.

23. The system according to claim 2, wherein the one or more processors are further configured to facilitate:

clustering extracted visual features into groups of visual features;

wherein visual words are based on the groups of visual features.

24. The system according to claim 23, wherein each visual word is a mean vector corresponding to each group of visual features.

25. The system according to claim 19, wherein the identified characteristic of the respective entity is the respective entity's gender.

26. The system according to claim 1, wherein the images reflect one or more interests of the respective entities; and wherein outputting the determined association between the first entity and the second entity is based on the first entity and the second entity having one or more similar interests.

* * * * *